United States Patent
Xiao et al.

(10) Patent No.: US 10,050,882 B2
(45) Date of Patent: Aug. 14, 2018

(54) METHOD FOR ADJUSTING MEDIA STREAM TRANSMISSION BANDWIDTH AND RELATED APPARATUS

(71) Applicant: Huawei Technologies Co., Ltd., Shenzhen (CN)

(72) Inventors: Jing Xiao, Shenzhen (CN); Weiwei Yang, Xi'an (CN); Haitao Wei, Shenzhen (CN); Jungang Ren, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 14/880,591

(22) Filed: Oct. 12, 2015

(65) Prior Publication Data

US 2016/0036704 A1    Feb. 4, 2016

Related U.S. Application Data

(63) Continuation of application No. PCT/CN2013/085363, filed on Oct. 17, 2013.

(30) Foreign Application Priority Data

Apr. 16, 2013    (CN) .......................... 2013 1 0131471

(51) Int. Cl.
*H04L 12/26* (2006.01)
*H04L 12/801* (2013.01)
(Continued)

(52) U.S. Cl.
CPC .......... *H04L 47/11* (2013.01); *H04L 47/2416* (2013.01); *H04L 65/80* (2013.01);
(Continued)

(58) Field of Classification Search
CPC ..... H04L 12/2856; H04L 47/10; H04L 47/12; H04L 47/14; H04L 47/263; H04L 47/11;
(Continued)

(56) References Cited

U.S. PATENT DOCUMENTS 7,457,290 B1 * 11/2008 Salama ............... H04L 12/2856
370/392
7,984,179 B1    7/2011 Huang
(Continued)

FOREIGN PATENT DOCUMENTS

| CN | 101123606 A | 2/2008 |
|---|---|---|
| CN | 101237389 A | 8/2008 |

(Continued)

OTHER PUBLICATIONS

C. Holmberg, Multiplexing Negotiation Using Session Description Protocol (SDP) Port Numbers, Feb. 2012, MMUSIC Working Group, Internet-Draft.*
(Continued)

*Primary Examiner* — Harun Chowdhury
(74) *Attorney, Agent, or Firm* — Conley Rose, P.C.

(57) ABSTRACT

A method for adjusting media stream transmission bandwidth and a related apparatus are provided. A media stream sending end acquires scores that are given, according to identifiers of multiple media streams, by a media stream receiving end to the media streams, where the multiple media streams are transmitted at a same transmission port, and these identifiers are described based on media stream content; when it is detected that congestion occurs or congestion is resolved, the media stream sending end performs transmission bandwidth adjustment on a corresponding media stream according to these scores, and therefore media stream transmission bandwidth adjustment may be performed, based on the media stream content, on the
(Continued)

multiple media streams transmitted at the same transmission port.

16 Claims, 13 Drawing Sheets

(51) Int. Cl.

| H04L 12/853 | (2013.01) |
| H04L 29/06 | (2006.01) |
| H04N 21/2385 | (2011.01) |
| H04N 21/24 | (2011.01) |
| H04N 21/637 | (2011.01) |
| H04N 21/6437 | (2011.01) |

(52) U.S. Cl.
CPC ..... *H04N 21/2385* (2013.01); *H04N 21/2402* (2013.01); *H04N 21/637* (2013.01); *H04N 21/6437* (2013.01)

(58) Field of Classification Search
CPC .. H04L 65/80; H04W 24/04; H04W 36/0016; H04W 36/0083; H04N 21/637; H04N 21/2385; H04N 21/2402; H04N 21/6437
USPC ................ 370/252, 389, 392, 400, 232, 237
See application file for complete search history.

(56) References Cited

U.S. PATENT DOCUMENTS

| 2011/0032935 | A1* | 2/2011 | Yang ........................ H04L 47/10 370/389 |
| 2012/0051222 | A1 | 3/2012 | Ogura |
| 2012/0087380 | A1 | 4/2012 | Tang et al. |
| 2013/0155889 | A1* | 6/2013 | Brownworth ..... H04W 36/0083 370/252 |
| 2015/0181164 | A1 | 6/2015 | Yang et al. |

FOREIGN PATENT DOCUMENTS

| CN | 101924742 A | 12/2010 |
| CN | 102422604 A | 4/2012 |
| CN | 102710586 A | 10/2012 |
| CN | 102843542 A | 12/2012 |

OTHER PUBLICATIONS

"H. TPS-AV "Audio/video parameters for telepresence systems" (New): Output Draft," ITU, Study Group 16, TD 31 R1 (WP 1/16), Jan. 14-25, 2013, 34 pages.

Partial English Translation and Abstract of Chinese Patent Application No. CN102710586, Oct. 14, 2015, 12 pages.
Jennings, C., et al., "Real-Time Communications for the Web," Web-Based Communications, IEEE Communications Magazine, Apr. 2013, pp. 20-26.
"Series H: Audiovisual and Multimedia Systems, Infrastructure of audiovisual services—Communication procedures, Implementors Guide for Recommendations of H.320 System ("Narrow-band visual telephone systems and terminal equipment"): H.320, H.221, H.224, H.230, H.242, H.243," ITU-T, H.320 System Implementors' Guide, Nov. 26, 2004, 9 pages.
"Series H: Audiovisual and Multimedia Systems, Infrastructure of audiovisual services—Systems and terminal equipment for audiovisual services, Packet-based multimedia communications systems, Amendment 1: Use of Facility message to enable call transfer," ITU-T, H.323, Amendment 1, Mar. 2013, 8 pages.
"Series H: Audiovisual and Multimedia Systems, Infrastructure of audiovisual services—Systems aspects, Role management and additional media channels for H.300-series terminals," ITU-T, H.239, Sep. 2005, 32 pages.
Westerlund, M., et al., "Multiple RTP Sessions on a Single Lower-Layer Transport," draft-westerlund-avtcore-transport-multiplexing-05, Feb. 25, 2013, 42 pages.
Lundin, H., et al., "A Google Congestion Control Algorithm for Real-Time Communication," draft-alvestrand-rmcat-congestion-00, Feb. 18, 2013, 18 pages.
Holmberg, C., et al., "Multiplexing Negotiation Using Session Description Protocol (SDP) Port Numbers," draft-ietf-mmusic-sdp-bundle-negotiation-03, Feb. 18, 2013, 19 pages.
Hautakorpi, J., et al., "The Session Description Protocol (SDP) Content Attribute," RFC 4796, Feb. 2007, 11 pages.
Rosenberg, J., et al., "SIP: Session Initiation Protocol," RFC 3261, Jun. 2002, 240 pages.
Foreign Communication From A Counterpart Application, European Application No. 13882078.2, Extended European Search Report dated Dec. 18, 2015, 9 pages.
Foreign Communication From A Counterpart Application, PCT Application No. PCT/CN2013/085363, English Translation of International Search Report dated Jan. 23, 2014, 2 pages.
Foreign Communication From A Counterpart Application, PCT Application No. PCT/CN2013/085363, English Translation of Written Opinion dated Jan. 23, 2014, 12 pages.
Bae, S., et al., "Response to MMT Call for Proposal," ISO/IEC JTC1/SC29/WG11 MPEG2011/M19331, Jan. 28, 2011, 5 pages.
Foreign Communication From A Counterpart Application, European Application No. 13882078.2, European Office Action dated Oct. 31, 2016, 7 pages.

* cited by examiner

METHOD FOR ADJUSTING MEDIA STREAM TRANSMISSION BANDWIDTH AND RELATED APPARATUS

CROSS-REFERENCE TO RELATED APPLICATIONS

This application is a continuation of International Application No. PCT/CN2013/085363, filed on Oct. 17, 2013, which claims priority to Chinese Patent Application No. 201310131471.1, filed on Apr. 16, 2013, both of which are hereby incorporated by reference in their entireties.

TECHNICAL FIELD

The present disclosure relates to the field of media communications technologies, and in particular, to a method for adjusting media stream transmission bandwidth and a related apparatus.

BACKGROUND

The development of media communications technologies leads to increasingly vigorous demands on application of multiple media streams; application of merely one video stream plus one audio stream cannot meet people's pursuit of multiple screens and multiple scenes. A typical example is that multiple displays are provided at a telepresence conference site, and images of multiple participants and a presentation material can be simultaneously displayed on different displays, so as to provide a more vivid immersive experience.

However, in a transmission process of a media stream, the media stream is generally transmitted from a network environment to another network environment, and therefore problems such as network address translation (NAT)/firewall (FW) traversal may be involved. An idea of solving the problems is to perform mapping on ports, that is, one-to-one mapping is performed between the ports. However, when the number of media streams increases, the number of ports that need to be mapped also increases, which results in complexity of the NAT/FW traversal operations and a large system overhead, and therefore occurrence of multiple streams has a relatively great impact on an entire network. An existing solution is, between a sending end and a receiving end, multiple media streams are sent and received at a same port, that is, a port is multiplexed to transmit the multiple media streams. However, in a transmission process, how to perform media stream transmission bandwidth adjustment on multiple media streams transmitted at a same transmission port when congestion occurs or congestion is resolved becomes a problem to be solved.

According to a solution in the prior art such as a communications apparatus disclosed by a patent application whose application number is CN201080020341.5 and publication date is Apr. 18, 2012, in a case in which a congestion level exceeds an evaluation value, the communications apparatus cuts off transmission of at least a stream that is in multiple streams transmitted concurrently and has a priority lower than those of the other streams, where a priority of each stream is described by priority information in a storage unit. The communications apparatus evaluates the congestion level in communication using a congestion window in the Stream Control Transmission Protocol (SCTP). However, at present, the SCTP is not widely used. The SCTP is for connection-based transmission. In practice, the User Datagram Protocol (UDP) is used for real-time audio and video streams, where the UDP is for connectionless-based transmission. Parallel transmission in the SCTP does not involve port multiplexing. UDP port multiplexing involves only one Internet Protocol (IP) address and only one port, but the parallel transmission of the SCTP needs multiple IP addresses and multiple ports. In addition, priority information of the SCTP is stored at a local end, and when congestion occurs, a problem that "a stream that a viewer at a receiving end is interested in is cut off because a sender considers the stream to be unimportant" may occur.

In conclusion, how to perform media stream transmission bandwidth adjustment on multiple media streams transmitted at a same transmission port when congestion occurs or congestion is resolved has become an urgent problem to be solved in the industry.

SUMMARY

In view of this, embodiments of the present disclosure provide a method for adjusting media stream transmission bandwidth and a related apparatus to solve a problem in the prior art that media stream transmission bandwidth adjustment cannot be performed on multiple media streams transmitted at a same transmission port.

According to a first aspect, a method for adjusting media stream transmission bandwidth is provided, including sending, by a media stream sending end, identifiers of at least two media streams to a media stream receiving end, where the at least two media streams are transmitted at a same transmission port, and the identifiers of the at least two media streams are each an identifier that is of each media stream in the at least two media streams and is described based on media stream content; acquiring, by the media stream sending end, a score given by the media stream receiving end to each media stream, where the score of each media stream is given by the media stream receiving end according to the identifier of each media stream; and when it is detected that congestion occurs or congestion is resolved, performing transmission bandwidth adjustment on at least one media stream according to a score of the at least one media stream.

In a first possible implementation manner, the media stream content based identifier includes at least one of the following features of each media stream: media capture content, image composed, capture content switching and/or a rule, dynamic content collection, a scene view, a role, a scene priority, presentation, and a language.

With reference to the first aspect or the first possible implementation manner of the first aspect, in a second possible implementation manner, the identifiers of the at least two media streams and the score of each media stream are sent in the following manner: adding a field to a packet header of a Real-Time Transport Protocol (RTP) message or a Real-Time Transport Control Protocol (RTCP) message to carry the identifier of each media stream or the score of each media stream; or, by using a Session Description Protocol (SDP) message, a Controlling Multiple Streams for Telepresence (CLUE) message, or a multimedia communication control protocol H.245 message, sending the identifier of each media stream to the media stream receiving end, or receiving, from the media stream receiving end, the score of each media stream.

With reference to the first aspect, the first possible implementation manner of the first aspect or the second possible implementation manner of the first aspect, in a third possible implementation manner, when it is detected that congestion occurs or congestion is resolved, performing transmission bandwidth adjustment on at least one media stream according to a score of the at least one media stream includes, when it is detected that the congestion occurs or the congestion is resolved, adjusting transmission bandwidth of the at least one media stream according to a ratio of the score of the at least one media stream to a total score, where the total score is the sum of scores of the at least two media streams; or when it is detected that the congestion occurs, for a media stream with a score greater than a first set threshold, keeping transmission bandwidth of the media stream; or when it is detected that the congestion occurs, for a media stream with a score less than a second set threshold, cutting off transmission of the media stream; or when it is detected that the congestion is resolved, for media streams with scores greater than a third set threshold, increasing transmission bandwidth of the media streams in equal proportion, and keeping transmission bandwidth of one or more other media streams in the at least two media streams; or when it is detected that the congestion is resolved, restoring transmission bandwidth of the at least one media stream to an initial transmission bandwidth value of the at least one media stream that is before the congestion occurs.

With reference to the first aspect, the first possible implementation manner of the first aspect, the second possible implementation manner of the first aspect or the third possible implementation manner of the first aspect, in a fourth possible implementation manner, the method further includes acquiring, by the media stream sending end, an update that is of the scores of the at least two media streams and is provided by the media stream receiving end; and when it is detected that the at least two media streams encounter congestion or congestion is resolved, performing transmission bandwidth adjustment on the at least one media stream according to an updated score.

According to a second aspect, a method for adjusting media stream transmission bandwidth is provided, including receiving, by a media stream receiving end, identifiers that are of at least two media streams and sent by a media stream sending end, where the at least two media streams are transmitted at a same transmission port, and the identifiers of the at least two media streams are each an identifier that is of each media stream in the at least two media streams and is described based on media stream content; scoring, by the media stream receiving end, each media stream according to the identifier of each media stream; and sending, by the media stream receiving end, a score of each media stream to the media stream sending end, such that when it is detected that congestion occurs or congestion is resolved, the media stream sending end performs transmission bandwidth adjustment on at least one media stream according to a score of the at least one media stream.

In a first possible implementation manner, the scoring, by the media stream receiving end, each media stream according to the identifier of each media stream includes selecting, by the media stream receiving end, all or some identifiers of each media stream, and assigning values to the selected identifiers, or using initial values, assigned by the media stream sending end to the selected identifiers, as values of the selected identifiers; and for each media stream, using, by the media stream receiving end, the sum of the values of the selected identifiers as the score of each media stream.

With reference to the first possible implementation manner of the second aspect, in a second possible implementation manner, after the assigning values to the selected identifiers, the method further includes allocating corresponding weights to the selected identifiers; and weighting, according to the weights of the selected identifiers, the values of the corresponding identifiers, and using values that are obtained after the weighting as weighted values of the selected identifiers; where for each media stream, using, by the media stream receiving end, the sum of the values of the selected identifiers as the score of each media stream is, for each media stream, using, by the media stream receiving end, the sum of the weighted values of the selected identifiers as the score of each media stream.

According to a third aspect, a media stream sending end is provided, including a first sending unit configured to send identifiers of at least two media streams to a media stream receiving end, where the at least two media streams are transmitted at a same transmission port, and the identifiers of the at least two media streams are each an identifier that is of each media stream in the at least two media streams and is described based on media stream content; a first receiving unit configured to acquire a score given by the media stream receiving end to each media stream, where the score of each media stream is given by the media stream receiving end according to the identifier of each media stream; and an adjusting unit configured to, when it is detected that congestion occurs or congestion is resolved, perform transmission bandwidth adjustment on at least one media stream according to a score of the at least one media stream.

In a first possible implementation manner, the media stream content based identifier includes at least one of the following features of each media stream: media capture content, image composed, capture content switching and/or a rule, dynamic content collection, a scene view, a role, a scene priority, presentation, and a language.

With reference to the third aspect or the first possible implementation manner of the third aspect, in a second possible implementation manner, the identifiers of the at least two media streams and the score of each media stream are sent in the following manner: adding a field to a packet header of an RTP message or an RTCP message to carry the identifier of each media stream or the score of each media stream; or, by using an SDP message, a CLUE message, or a multimedia communication control protocol H.245 message, sending the identifier of each media stream to the media stream receiving end, or receiving, from the media stream receiving end, the score of each media stream.

With reference to the third aspect, the first possible implementation manner of the third aspect or the second possible implementation manner of the third aspect, in a third possible implementation manner, the adjusting unit includes a first adjusting unit configured to, when it is detected that the congestion occurs or the congestion is resolved, adjust transmission bandwidth of the at least one media stream according to a ratio of the score of the at least one media stream to a total score, where the total score is the sum of scores of the at least two media streams; or a keeping unit configured to, when it is detected that the congestion occurs, for a media stream with a score greater than a first set threshold, keep transmission bandwidth of the media stream; or a cutoff unit configured to, when it is detected that the congestion occurs, for a media stream with a score less than a second set threshold, cut off transmission of the media stream; or a second adjusting unit configured to, when it is detected that the congestion is resolved, for media streams with scores greater than a third set threshold, increase transmission bandwidth of the media streams in equal proportion, and keep transmission bandwidth of one or more other media streams in the at least two media streams; or a restoring unit configured to, when it is detected that the congestion is resolved, restore transmission bandwidth of the at least one media stream to an initial transmission bandwidth value of the at least one media stream that is before the congestion occurs.

With reference to the third aspect, the first possible implementation manner of the third aspect, the second possible implementation manner of the third aspect or the third possible implementation manner of the third aspect, in a fourth possible implementation manner, the media stream sending end further includes an updating unit configured to acquire an update that is of the scores of the at least two media streams and is provided by the media stream receiving end, where the adjusting unit is further configured to, when it is detected that the at least two media streams encounter congestion or congestion is resolved, perform transmission bandwidth adjustment on the at least one media stream according to an updated score.

According to a fourth aspect, a media stream receiving end is provided, including a second receiving unit configured to receive identifiers that are of at least two media streams and sent by a media stream sending end, where the at least two media streams are transmitted at a same transmission port, and the identifiers of the at least two media streams are each an identifier that is of each media stream in the at least two media streams and is described based on media stream content; a scoring unit configured to score each media stream according to the identifier of each media stream; and a second sending unit configured to send a score of each media stream to the media stream sending end, such that when it is detected that congestion occurs or congestion is resolved, the media stream sending end performs transmission bandwidth adjustment on at least one media stream according to a score of the at least one media stream.

In a first possible implementation manner, the scoring unit includes a value assigning unit configured to select all or some identifiers of each media stream, and assign values to the selected identifiers, or use initial values, assigned by the media stream sending end to the selected identifiers, as values of the selected identifiers; and a score acquiring unit configured to use, for each media stream, the sum of the values of the selected identifiers as the score of each media stream.

With reference to the first possible implementation manner of the fourth aspect, in a second possible implementation manner, the scoring unit further includes an allocating unit configured to allocate corresponding weights to the selected identifiers; and a weighting unit configured to weight, according to the weights of the selected identifiers, the values of the corresponding identifiers, and use values that are obtained after the weighting as weighted values of the selected identifiers, where the score acquiring unit is further configured to use, for each media stream, the sum of the weighted values of the selected identifiers as the score of each media stream.

According to a fifth aspect, a media stream receiving and sending system is provided, including the media stream sending end according to the third aspect, the first possible implementation manner of the third aspect, the second possible implementation manner of the third aspect, the third possible implementation manner of the third aspect or the fourth possible implementation manner of the third aspect, the media stream receiving end according to the fourth aspect, the first possible implementation manner of the fourth aspect or the second possible implementation manner of the fourth aspect, and a transport network, where the media stream sending end and the media stream receiving end exchange information using the transport network.

According to the method for adjusting media stream transmission bandwidth and the related apparatuses that are provided by the present disclosure, a media stream sending end acquires scores that are given, according to identifiers of multiple media streams, by a media stream receiving end to the media streams, where the multiple media streams are transmitted at a same transmission port, and these identifiers are described based on media stream content; when it is detected that congestion occurs or congestion is resolved, the media stream sending end performs transmission bandwidth adjustment on a corresponding media stream according to these scores, and therefore media stream transmission bandwidth adjustment may be performed, based on the media stream content, on the multiple media streams transmitted at the same transmission port.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
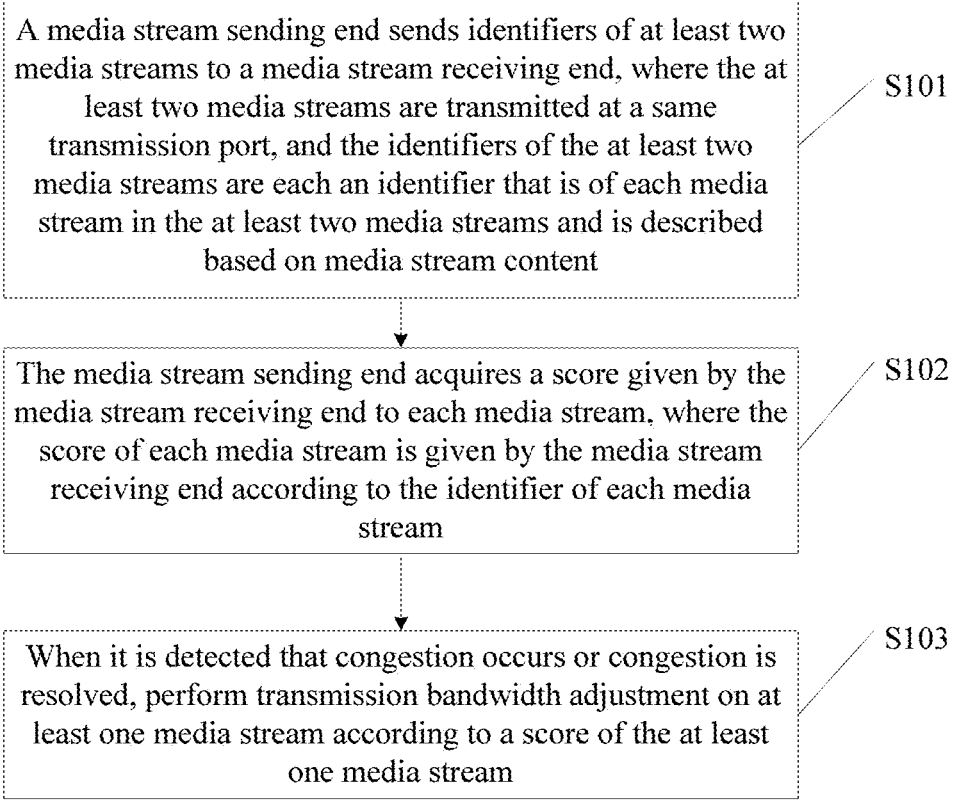
FIG. 1 is a method flowchart of an embodiment of a method for adjusting media stream transmission bandwidth according to the present disclosure.

FIG. 1 is a method flowchart of an embodiment of a method for adjusting media stream transmission bandwidth according to the present disclosure. As shown in FIG. 1, the method includes the following steps.

end and the media stream receiving end may be any media communications apparatus such as a conference terminal, a multipoint control unit (MCU), and a browser.

Content of each media stream is described using an identifier, and each media stream is described using one or more identifiers that are based on the media stream content. The media stream content based identifier includes one or more of the following features of each media stream: media capture content, image composed, capture content switching and/or a rule, dynamic content collection, a scene view, a role, a scene priority, presentation, and a language. Meanings of these features are listed in Table 1.

TABLE 1

Meanings of the features of the media stream content based identifier

| Feature name | Feature meaning | Possible value |
| --- | --- | --- |
| Media capture content | Describes a use of the capture content | Mainstream, slide, and the like |
| Image composed | Indicates whether the capture content is composed of video streams or audio streams | Yes or no |
| Capture content switching and/or rule | Indicates that the capture content depends on a specific rule | The value may be yes or no, or may be selected from multiple rules |
| Dynamic content collection | Indicates that spatial information associated with the capture content may be dynamic or changeable in a conference, and has a feature of being static, being dynamic, or being frequently changing, where a capture point of static capture content does not move during an entire conference; a capture point of dynamic capture content changes within a proper stable range; and a capture point of frequently changing capture content often moves | Static, dynamic, or frequently changing |
| Scene view | Indicates a definition of a physical domain attribute of a media stream | Entire capture scenario (Room), seat and participant (Table), individual participant (Individual), lecturer and lectern (Lectern), and audience (Audience) in a classroom scenario |
| Role | Divided into an individual role and a conference role, where the individual role is related to a title associated with the capture content, and includes: a manager (Manager), a conference chairman (Chairman), a secretary (Secretary), a lecturer (Lecturer), an audience (Audience), and so on; and the conference role is related to multimedia conference creation and maintenance, is related to a conference system, and includes a current speaker (Speaker) and a controller (Controller), where the controller is a current data controller of a conference | Manager, conference chairman, secretary, lecturer, audience, current speaker, controller, and the like |
| Scene priority | Identifies relative priorities of different media streams, represents preference of a media provider, and may be selected and considered by a recipient, and used for media screening in a case of overload, where detailed implementation includes that parameters are arranged in sequence, or a value is assigned to each media stream | Positive integer |
| Presentation | Includes a video, a slide, data, and the like according to a presentation content attribute | Video, slide, data, and the like |
| Language | Identifies which language is used in a media stream, including a sign language | English, Chinese, sign language, and the like |

Step S101: A media stream sending end sends identifiers of at least two media streams to a media stream receiving end, where the at least two media streams are transmitted at a same transmission port, and the identifiers of the at least two media streams are each an identifier that is of each media stream in the at least two media streams and is described based on media stream content.

In this embodiment of the present disclosure, the media stream sending end sends the multiple media streams to the media stream receiving end using the same transmission port, such as a UDP port, where the media stream sending The media stream sending end sends the identifier to the media stream receiving end, where a sending manner includes inserting the identifier by adding a field to a packet header of an RTP message or an RTCP message; or sending the identifier using an SDP message, a CLUE message, or a multimedia communication control protocol H.245 message.

Step S102: The media stream sending end acquires a score given by the media stream receiving end to each media stream, where the score of each media stream is given by the media stream receiving end according to the identifier of each media stream.

In this step, the media stream sending end acquires the score given by the media stream receiving end to each media stream, where the score of each media stream is given by the media stream receiving end according to the received identifier of each media stream, the identifier is described based on the media stream content, and therefore the score may reflect preference, a degree of concern, a policy, and the like of the media stream receiving end for each media stream.

There are multiple choices for a time of score sending. The media stream receiving end may immediately give the score after receiving the identifier sent by the media stream sending end and send the score to the media stream sending end, or may send the score only when it is detected that congestion occurs or congestion is resolved.

The media stream sending end acquires the score that is given to each media stream and sent by the media stream receiving end, where a manner of sending the score includes inserting the score by adding a field to a packet header of an RTP message or an RTCP message; or sending the score using an SDP message, a CLUE message, or a multimedia communication control protocol H.245 message.

Step S103: When it is detected that congestion occurs or congestion is resolved, perform transmission bandwidth adjustment on at least one media stream according to a score of the at least one media stream.

When it is detected that the congestion occurs or the congestion is resolved, transmission bandwidth of one or more media streams is adjusted according to scores of the corresponding one or more multiple media streams, for example, the transmission bandwidth is reduced or increased. Each media stream may have a different score, and therefore transmission bandwidth adjustment of the corresponding media streams may be different.

As an implementation manner, when it is detected that the congestion occurs or the congestion is resolved, transmission bandwidth of the at least one media stream is adjusted according to a ratio of the score of the at least one media stream to a total score, where the total score is the sum of scores of the at least two media streams.

As another implementation manner, when it is detected that the congestion occurs, for a media stream with a score greater than a set threshold, transmission bandwidth of the media stream is kept, so as to ensure that a media stream preferred by the media stream receiving end may be transmitted smoothly. For one or more other media streams, media stream transmission bandwidth is reduced.

As still another implementation manner, when it is detected that the congestion occurs, for a media stream with a score less than a set threshold, transmission of the media stream is cut off. In this way, when the congestion occurs, transmission of some media streams with lower degrees of concern is cut off according to a media content based choice made by the media stream receiving end, so as to ensure transmission of one or more other media streams.

As yet another implementation manner, when it is detected that the congestion is resolved, for media streams with scores greater than a third set threshold, transmission bandwidth of the media streams is increased in equal proportion, and transmission bandwidth of one or more other media streams is kept. In this way, it is ensured that a media stream with a greater score is given preference to obtain a transmission bandwidth resource.

As still yet another implementation manner, when it is detected that the congestion is resolved, transmission bandwidth of the media stream is restored to an initial transmission bandwidth value of the media stream that is before the congestion occurs. This transmission bandwidth adjustment manner is simple and easy to implement.

According to the method for adjusting media stream transmission bandwidth provided by this embodiment of the present disclosure, a media stream sending end acquires scores that are given, according to identifiers of multiple media streams, by a media stream receiving end to the media streams, where the multiple media streams are transmitted at a same transmission port, and these identifiers are described based on media stream content; when it is detected that congestion occurs or congestion is resolved, the media stream sending end performs transmission bandwidth adjustment on a corresponding media stream according to these scores, and therefore media stream transmission bandwidth adjustment may be performed, based on the media stream content, on the multiple media streams transmitted at the same transmission port.

For a better understanding of the technical solution provided by the foregoing embodiment of the present disclosure, the following uses an implementation manner in a specific scenario as an example for description.

Figure 2:
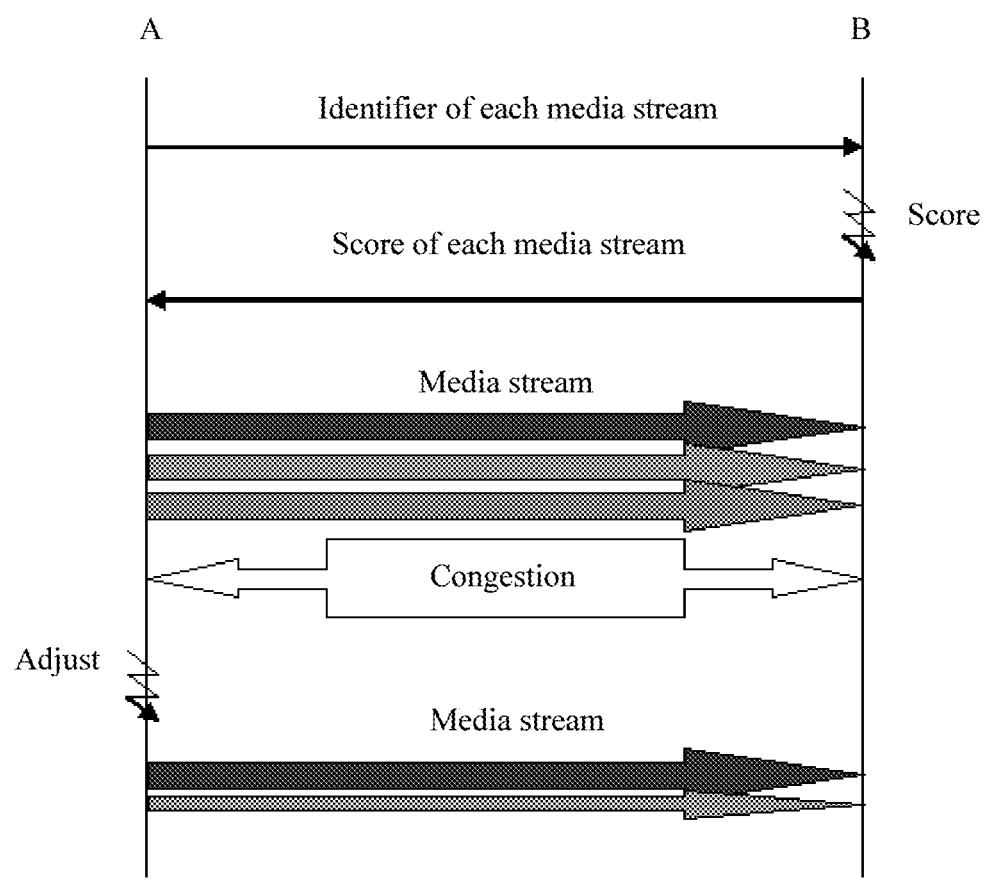
FIG. 2 is a diagram of an application scenario of another embodiment of a method for adjusting media stream transmission bandwidth according to the present disclosure.

Refer to FIG. 2, which is a diagram of an application scenario of another embodiment of a method for adjusting media stream transmission bandwidth according to the present disclosure. In FIGS. 2, A and B represent a UDP port of a media stream sending end and a UDP port of a media stream receiving end respectively, where port A sends multiple media streams to port B.

As an implementation manner, before the media streams are sent, port A allocates, based on content of the media streams, one or more identifiers to the media streams. Port A may send these identifiers to port B by inserting these identifiers in an SDP message. Port B scores the media streams according to a policy and by using information about these identifiers, and then, port B sends scores to port A still by using an SDP message. When it is detected that congestion occurs or congestion is resolved, the media stream sending end may perform corresponding adjustment on media stream transmission bandwidth according to the scores.

For example, port A provides port B with the following identifiers using the SDP message:
 m=video 52886 RTP/AVP 31 (a definition of an overall scene of a conference room)
 a=rtpmap:31 H261/9000 (a coding and decoding format)
 a=view:2 (room) (a scene view is an entire conference site)
 a=priority:3 (a scene priority)
 a=dynamic:0 (dynamic content collection)
 m=video 52886 RTP/AVP 32 (a definition of a scene of left ⅓ seats and participants in the conference room)
 a=rtpmap:32 H261/9000
 a=view:1 (table) (a scene view is a seat)
 a=priority:4 (a scene priority)
 a=dynamic:0 (dynamic content collection)
 m=video 52886 RTP/AVP 33 (a definition of a scene of middle ⅓ seats and participants in the conference room)
 a=rtpmap:33 H261/9000
 a=view:1 (table) (a scene view is a seat)
 a=priority:4 (a scene priority)
 a=dynamic:0 (dynamic content collection)
 m=video 52886 RTP/AVP 34 (a definition of a scene of right ⅓ seats and participants in the conference room)
 a=rtpmap:34 H261/9000
 a=view:1 (table) (a scene view is a seat)
 a=priority:4 (a scene priority)
 a=dynamic:0 (dynamic content collection)

m=video 52886 RTP/AVP 35 (a definition of a dynamic scene of a lecturer in the conference room)
  a=rtpmap:35 H261/9000
  a=view:1 (room) (a scene view is the entire conference site)
  a=priority:2 (a scene priority)
  a=dynamic:1 (dynamic content collection)
m=video 53334 RTP/AVP 31 (a definition of presentation content 1 in the conference room)
  a=rtpmap:31 H261/9000
  a=presentation: data (a definition of a scene view of presentation stream channel 1)
  a=priority:1 (a scene priority)
m=video 53334 RTP/AVP 32 (a definition of presentation content 2 in the conference room)
  a=rtpmap:32 H261/9000
  a=presentation: video (a definition of a scene view of presentation stream channel 2)
  a=priority:5 (a scene priority)

After receiving the SDP message, port B scores a corresponding media stream according to the identifiers.

For example, corresponding numerical values (integers) are allocated to different values of the identifiers, and a score of a media stream is the sum of all the numerical values. It should be noted that these integers may be positive or zero.

Alternatively, some specific identifiers rather than all the identifiers are selected.

For example, the following media streams are described using the SDP message:
m=video 52886 RTP/AVP 31 (a definition of an overall scene of a conference room)
  a=rtpmap:31 H261/9000 (a coding and decoding format)
  a=view:2 (room) (a scene view is an entire conference site)
  a=priority:3 (a scene priority)
  a=dynamic:0 (dynamic content collection)
m=video 52886 RTP/AVP 32 (a definition of a scene of left ⅓ seats and participants in the conference room)
  a=rtpmap:32 H261/9000
  a=view:1 (table) (a scene view is a seat)
  a=priority:4 (a scene priority)
  a=dynamic:0 (dynamic content collection)

A value of a score of the first media stream is: 2+3+0=5.
A value of a score of the second media stream is: 1+4+0=5.

Port B sends the scores to port A by inserting the scores in an SDP message.

The following uses an example to describe media message descriptions in the SDP message that is sent by port B. The SDP message carries score information using an extended parameter a=ranking:N, where N is a scoring result.

m=video 52886 RTP/AVP 31 (a definition of an overall scene of a conference room)
  a=rtpmap:31 H261/9000 (a coding and decoding format)
  a=view:2 (room) (a scene view is an entire conference site)
  a=priority:3 (a scene priority)
  a=dynamic:0 (dynamic content collection)
  a=ranking:5 (an extended score parameter)
m=video 52886 RTP/AVP 32 (a definition of a scene of left ⅓ seats and participants in the conference room)
  a=rtpmap:32 H261/9000
  a=view:1 (table) (a scene view is a seat)
  a=priority:4 (a scene priority)
  a=dynamic:0 (dynamic content collection)
  a=ranking:5 (an extended score parameter)
m=video 52886 RTP/AVP 33 (a definition of a scene of middle ⅓ seats and participants in the conference room)
  a=rtpmap:33 H261/9000
  a=view:1 (table) (a scene view is a seat)
  a=priority:4 (a scene priority)
  a=dynamic:0 (dynamic content collection)
  a=ranking:5 (an extended score parameter)
m=video 52886 RTP/AVP 34 (a definition of a scene of right ⅓ seats and participants in the conference room)
  a=rtpmap:34 H261/9000
  a=view:1 (table) (a scene view is a seat)
  a=priority:4 (a scene priority)
  a=dynamic:0 (dynamic content collection)
  a=ranking:5 (an extended score parameter)
m=video 52886 RTP/AVP 35 (a definition of a dynamic scene of a lecturer in the conference room)
  a=rtpmap:35 H261/9000
  a=view:1 (room) (a scene view is the entire conference site)
  a=priority:2 (a scene priority)
  a=dynamic:1 (dynamic content collection)
  a=ranking:4 (an extended score parameter)
m=video 53334 RTP/AVP 31 (a definition of presentation content 1 in the conference room)
  a=rtpmap:31 H261/9000
  a=presentation:3 (presentation stream channel 1)
  a=priority:1 (a scene priority)
  a=ranking:4 (an extended score parameter)
m=video 53334 RTP/AVP 32 (a definition of presentation content 2 in the conference room)
  a=rtpmap:32 H261/9000
  a=presentation:3 (presentation stream channel 2)
  a=priority:5 (a scene priority)
  a=ranking:8 (an extended score parameter)

Values assigned by the media stream receiving end to the identifiers may be also directly sent to the media stream sending end using an SDP response message, and then the media stream sending end uses the sum of the values of the identifiers of each media stream as a score of the media stream.

When the congestion occurs or the congestion is resolved, the media stream sending end may adjust media stream transmission bandwidth according to the score.

It is assumed that bandwidth of an entire port needs to be reduced by 2 M; according to the foregoing example:

$$\tfrac{1}{5}+\tfrac{1}{5}+\tfrac{1}{5}+\tfrac{1}{5}+\tfrac{1}{4}+\tfrac{1}{4}+\tfrac{1}{8}=1.425$$

therefore, rates of the first four media streams (the scores are 5) are separately reduced by ⅕/1.425*2=0.28 M;

rates of the later two media streams (the scores are 4) are separately reduced by ¼/1.425*2=0.35 M; and a rate of the last media stream (the score is 8) is reduced by ⅛/1.425*2=0.18 M.

As another implementation manner, before or after media stream transmission starts, a CLUE message may be also used to carry the foregoing identifiers. Media message descriptions in the CLUE message that is sent by the media stream sending end are:

Advertisement:
Capture Scene 1:
Capture Scene Entry 1: VC1
Capture Scene Entry 2: VC2, VC3, VC4
Capture Scene Entry 3: VC5
Capture Scene 2:
Capture Scene Entry 4: VC6
Capture Scene Entry 5: VC7

VC1: priority=3 (a scene priority), lang=ENG (a language), scene view=room (a scene view), Dynamic=1 (dynamic content collection), composed=0 (image composed), encodinggroup=1;

VC2: priority=4, lang=0, scene view=1 (table), Dynamic=0, composed=0, encodinggroup=1;

VC3: priority=4, lang=0, scene view=1 (table), Dynamic=0, composed=0, encodinggroup=1;

VC4: priority=4, lang=0, scene view=1 (table), Dynamic=0, composed=0, encodinggroup=1;

VC5: priority=2, lang=0, scene view=1 (table), Dynamic=1, composed=0, encodinggroup=1;

VC6: priority=1, lang=0, scene view=3 (presentation), Dynamic=0, composed=0, encodinggroup=2;

VC7: priority=5, lang=0, scene view=3 (presentation), Dynamic=0, composed=0, encodinggroup=2; and

STS: {VC1, VC2, VC4, VC5, CS2; VC3, VC2, VC4, VC5, CS2}.

It should be noted that the Capture Scene, the encoding group, and the STS are other message bodies of the CLUE message, and other parts are identifier content.

After receiving the CLUE message, port B scores corresponding media streams according to the identifiers.

For example, corresponding numerical values (integers) are allocated to different values of the identifiers, and a score of a media stream is the sum of all the numerical values. It should be noted that these integers may be positive or zero.

Alternatively, some specific identifiers rather than all the identifiers are selected.

For example:
for the following media stream descriptions:

VC1: priority=3, lang=0, scene view=room, Dynamic=1, composed=0, encoding group=1;

VC2: priority=4, lang=0, scene view=table, Dynamic=0, composed=0, encoding group=1;

original values of the media streams may be kept, and a corresponding value is assigned to an identifier without an assigned value. For example, a value of ENG is 0, a value of room is 2, and a value of table is 1, and therefore VC1=3+0+2+1+0=6, and VC2=4+0+1+0+0=5.

Port B sends the scores to port A by inserting the scores in a CLUE message.

It is assumed that port B chooses to receive VC1, VC2, VC4, VC6, and VC7, and score values of VC1, VC2, VC4, VC6, and VC7 are separately carried behind numbers of the media streams. Negotiation message descriptions in the CLUE message that is sent by port B are as follows:

Configure:
VC1=6 (an extended score parameter): Encode1
VC2=5 (an extended score parameter): Encode2
VC4=5 (an extended score parameter): Encode3
VC6=4 (an extended score parameter): Encode4
VC7=8 (an extended score parameter): Encode5 where a score of VC1 is 6, a score of VC2 is 5, a score of VC4 is 5, a score of VC6 is 4, and a score of VC7 is 8.

When the congestion occurs or the congestion is resolved, the media stream sending end may adjust media stream transmission bandwidth according to the scores. For example, bandwidth of an entire port needs to be reduced by 2 M; according to the foregoing example:

$$VC1+VC2+VC4+VC6+VC7=8/6+8/5+8/5+8/4+8/8=7.53$$

therefore, a rate of VC1 is reduced by 8/6/7.53*2=0.35 M;
a rate of VC2 is reduced by 8/5/7.53*2=0.42 M;
a rate of VC4 is reduced by 8/5/7.53*2=0.42 M;
a rate of VC6 is reduced by 8/4/7.53*2=0.53 M; and
a rate of VC7 is reduced by 8/8/7.53*2=0.28 M.

As still another implementation manner, using a multimedia communication control protocol H.245 message, an identifier of each media stream may be sent to the media stream receiving end, or a score of each media stream may be received from the media stream receiving end.

According to the method for adjusting media stream transmission bandwidth provided by this embodiment of the present disclosure, a media stream sending end acquires scores that are given, according to identifiers of multiple media streams, by a media stream receiving end to the media streams, where the multiple media streams are transmitted at a same transmission port, and these identifiers are described based on media stream content; when it is detected that congestion occurs or congestion is resolved, the media stream sending end performs transmission bandwidth adjustment on a corresponding media stream according to these scores, and therefore media stream transmission bandwidth adjustment may be performed, based on the media stream content, on the multiple media streams transmitted at the same transmission port.

Figure 3:
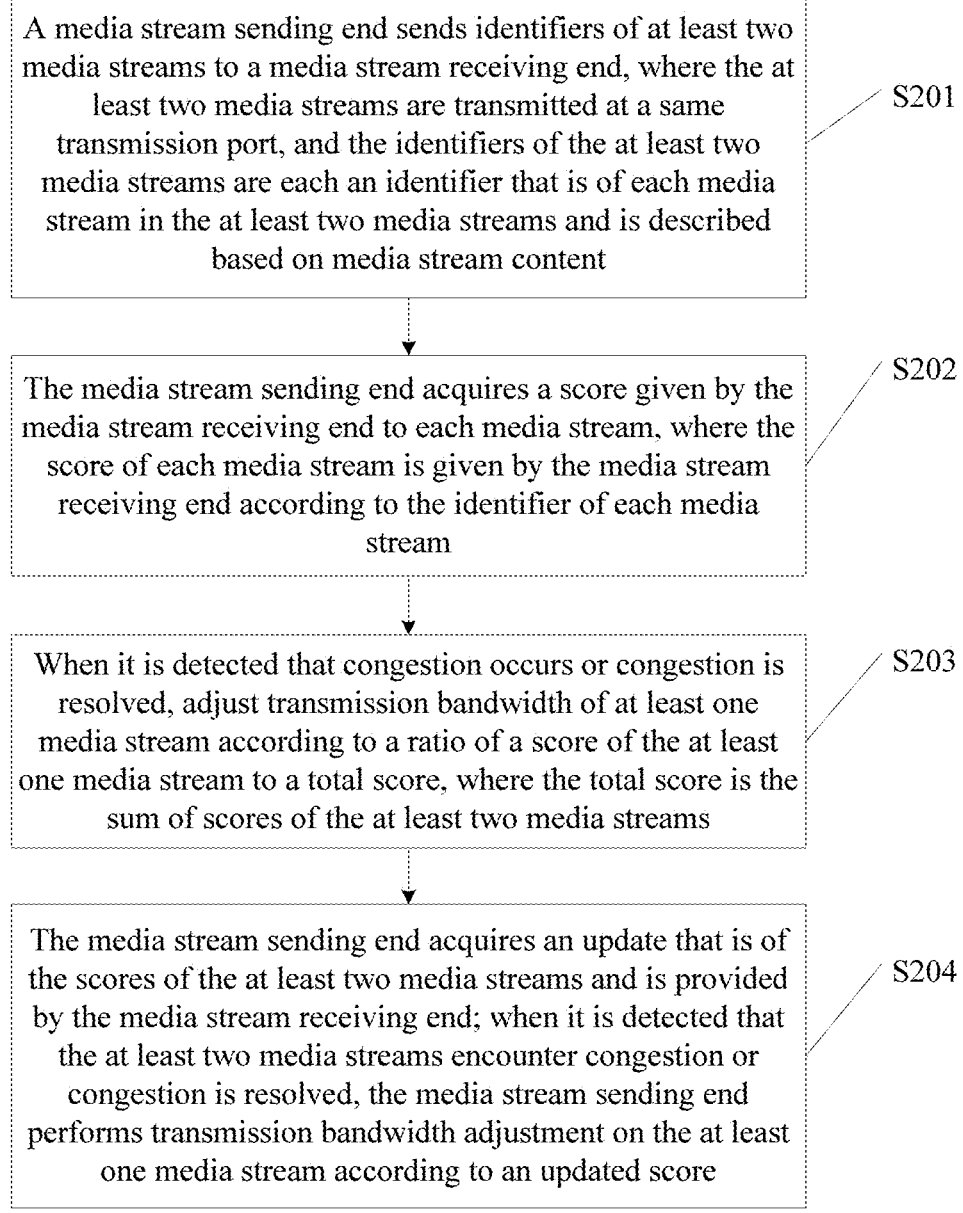
FIG. 3 is a further detailed method flowchart of the embodiment of the method for adjusting media stream transmission bandwidth shown in FIG. 1 according to the present disclosure.

FIG. 3 is a further detailed method flowchart of the embodiment of the method for adjusting media stream transmission bandwidth shown in FIG. 1 according to the present disclosure. As shown in FIG. 3, the method includes the following steps.

Step S201: A media stream sending end sends identifiers of at least two media streams to a media stream receiving end, where the at least two media streams are transmitted at a same transmission port, and the identifiers of the at least two media streams are each an identifier that is of each media stream in the at least two media streams and is described based on media stream content.

Step S202: The media stream sending end acquires a score given by the media stream receiving end to each media stream, where the score of each media stream is given by the media stream receiving end according to the identifier of each media stream.

Step S201 and step S202 are the same as or similar to step S101 and step S102 in the foregoing embodiment respectively, and details are not described herein again.

Step S203: When it is detected that congestion occurs or congestion is resolved, adjust transmission bandwidth of at least one media stream according to a ratio of a score of the at least one media stream to a total score, where the total score is the sum of scores of the at least two media streams.

For transmission bandwidth adjustment, as an implementation manner, in step S203, the sum of the scores of the media streams is first calculated and used as the total score, and transmission bandwidth of a corresponding media stream is adjusted according to a ratio of the score of each media stream to the total score.

As another implementation manner or an alternative to step S203, when it is detected that the congestion occurs, for a media stream with a score greater than a set threshold, transmission bandwidth of the media stream is kept, so as to ensure that a media stream preferred by the media stream receiving end may be transmitted smoothly. For one or more other media streams, media stream transmission bandwidth is reduced.

For example, media stream 1 whose score is 8 occupies a bandwidth of 2 M; media stream 2 whose score is 7 occupies a bandwidth of 2 M; media stream 3 whose score is 4 occupies a bandwidth of 1 M; media stream 4 whose score is 3 occupies a bandwidth of 1 M. If bandwidth of the port needs to be reduced by 2 M, the bandwidth of media stream 1 is not reduced, but the bandwidth of media stream 2, media stream 3, and media stream 4 is separately reduced by ⅔ M; or the bandwidth of media stream 1 and media stream 2 is not reduced, but the bandwidth of media stream 3 and media stream 4 is separately reduced by 1 M.

As still another implementation manner or an alternative to step S203, when it is detected that the congestion occurs, for a media stream with a score less than a set threshold, transmission of the media stream is cut off. In this way, when the congestion occurs, transmission of some media streams with lower degrees of concern is cut off according to a media content based choice made by the media stream receiving end, so as to ensure transmission of one or more other media streams.

For example, media stream 1 whose score is 8 occupies a bandwidth of 2 M; media stream 2 whose score is 7 occupies a bandwidth of 2 M; media stream 3 whose score is 4 occupies a bandwidth of 1 M; media stream 4 whose score is 3 occupies a bandwidth of 1 M. If the bandwidth of the port needs to be reduced by 2 M, transmission of media stream 3 and media stream 4 is cut off to ensure that the bandwidth of media stream 1 and media stream 2 remains unchanged; if the bandwidth of the port needs to be reduced by 1 M, transmission of media stream 4 is cut off A transmission bandwidth adjustment operation performed when the congestion is resolved is reverse to that performed when the congestion occurs.

As yet another implementation manner, when it is detected that the congestion is resolved, for media streams with scores greater than a third set threshold, transmission bandwidth of the media streams is increased in equal proportion, and transmission bandwidth of one or more other media streams is kept. In this way, it is ensured that a media stream with a greater score is given preference to obtain a transmission bandwidth resource.

As still yet another implementation manner, when it is detected that the congestion is resolved, transmission bandwidth of the media stream is restored to an initial transmission bandwidth value of the media stream that is before the congestion occurs. This transmission bandwidth adjustment manner is simple and easy to implement.

There may be the following three manners of detecting congestion or that congestion is resolved.

Manner 1: A network element device in a network detects congestion or that congestion is resolved, and informs the media stream receiving end.

Manner 2: The media stream sending end detects congestion, and informs the media stream receiving end.

Manner 3: The media stream receiving end detects congestion.

For manner 1 and manner 2, the media stream receiving end only needs to be able to parse a message sent by the network element device or the media stream sending end, and send a score according to the message.

For manner 3, the media stream receiving end needs to have a congestion detection capability, that is, the media stream receiving end can actively detect that congestion occurs on a network and a detection module is needed.

Step S204: The media stream sending end acquires an update that is of the scores of the at least two media streams and is provided by the media stream receiving end; when it is detected that the at least two media streams encounter congestion or congestion is resolved, the media stream sending end performs transmission bandwidth adjustment on the at least one media stream according to an updated score.

Possibly, because of some factors, for example, the media stream receiving end has a change in interest, the media stream receiving end may redefine a scoring rule for these media streams, and perform scoring again, which is a dynamic updating process of scores. The dynamic updating process needs to depend only on an identifier, that is, only an initial identifier is needed. Therefore, the media stream receiving end may control a time of score sending.

Figure 4:
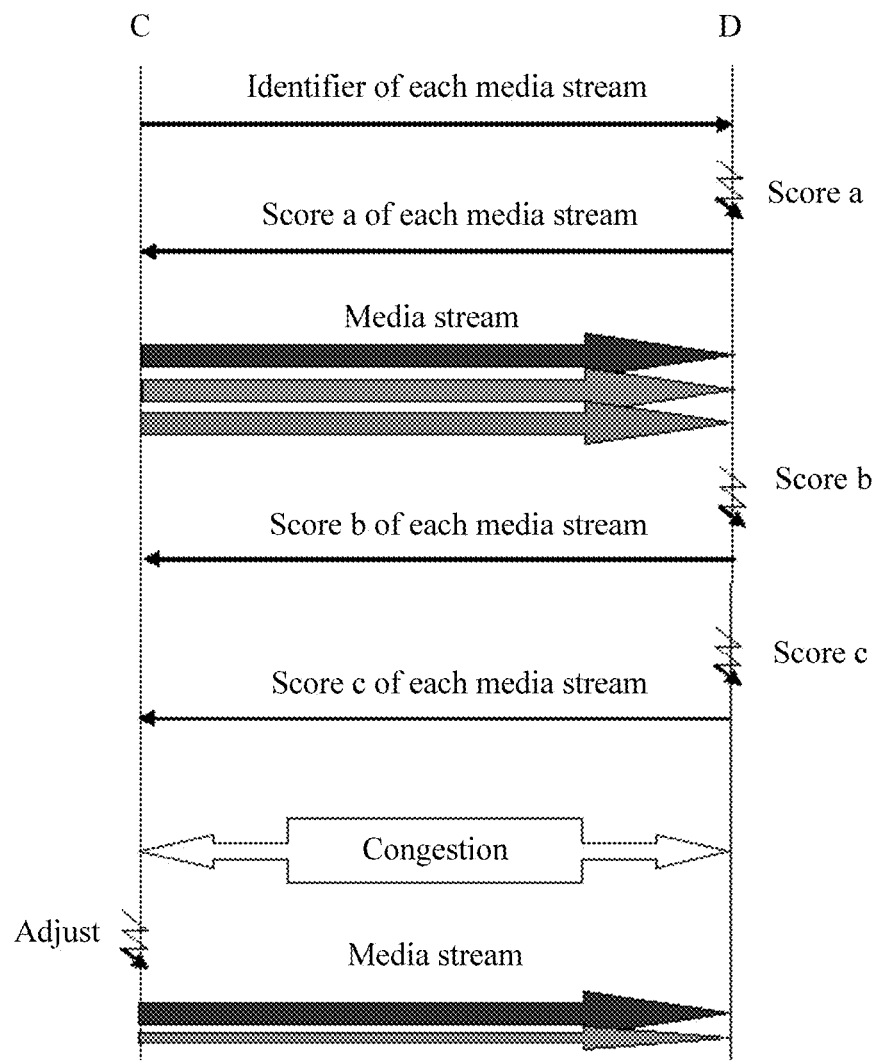
FIG. 4 is a diagram of an application scenario of still another embodiment of a method for adjusting media stream transmission bandwidth according to the present disclosure.

Refer to FIG. 4, which is a diagram of an application scenario of still another embodiment of a method for adjusting media stream transmission bandwidth according to the present disclosure. In FIGS. 4, C and D represent a port of a media stream sending end and a port of a media stream receiving end respectively, where port C is a UDP port and sends multiple media streams to port D. As shown in FIG. 4, port D separately sends two updated scores, which are separately score b and score c, and the last score is score c.

A manner of determining which score is a former score and which score is a latter score may be the following.

1. Perform determining according to a sequence in which scores are received, where after a new score is received, an old score may be directly discarded.

2. Perform determining according to sequence numbers of scores, where a score with a latter sequence number is a latest score. A sequence number of a score may be a sequence number of a message that carries the score, that is, a sequence number of an SDP, a CLUE, or an H.245 message, or a new sequence number may be allocated to the score (in this case, when the score is updated, the sequence number of the score also needs to be updated).

According to the method for adjusting media stream transmission bandwidth provided by this embodiment of the present disclosure, a media stream sending end acquires scores that are given, according to identifiers of multiple media streams, by a media stream receiving end to the media streams, and acquires updates of the scores, where the multiple media streams are transmitted at a same transmission port, and these identifiers are described based on media stream content; when it is detected that congestion occurs or congestion is resolved, the media stream sending end performs transmission bandwidth adjustment on a corresponding media stream according to these scores, and therefore media stream transmission bandwidth adjustment may be performed, based on the media stream content, on the multiple media streams transmitted at the same transmission port.

Figure 5:
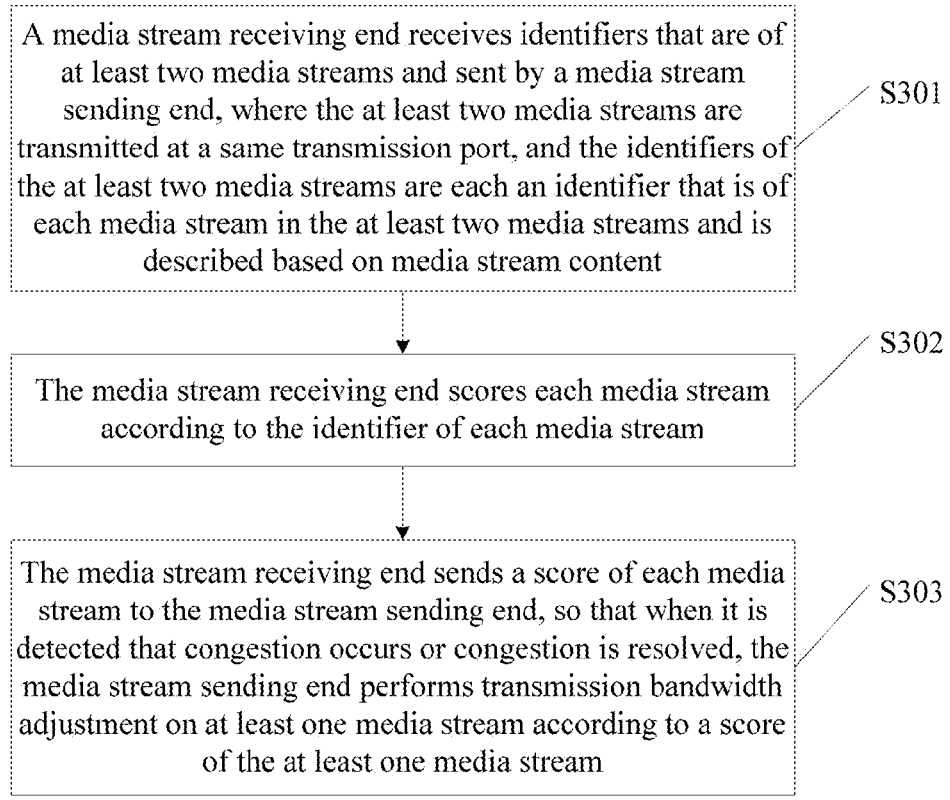
FIG. 5 is a method flowchart of yet another embodiment of a method for adjusting media stream transmission bandwidth according to the present disclosure.

FIG. 5 is a method flowchart of yet another embodiment of a method for adjusting media stream transmission bandwidth according to the present disclosure. As shown in FIG. 5, the method includes the following steps.

Step S301: A media stream receiving end receives identifiers that are of at least two media streams and sent by a media stream sending end, where the at least two media streams are transmitted at a same transmission port, and the identifiers of the at least two media streams are each an identifier that is of each media stream in the at least two media streams and is described based on media stream content.

In this embodiment of the present disclosure, the media stream receiving end receives the multiple media streams sent by the media stream sending end, where the media stream sending end and the media stream receiving end may be any media communications apparatus such as a conference terminal, an MCU, and a browser.

The media stream sending end describes content of each media stream using an identifier, and each media stream is described using one or more identifiers that are based on the media stream content. The media stream content based identifier includes one or more of the following features of each media stream: media capture content, image composed, capture content switching and/or a rule, dynamic content collection, a scene view, a role, a scene priority, presentation, and a language. A definition of the identifier in this embodiment is the same as the definition of the identifier in the foregoing embodiment, and details are not described herein again.

Step S302: The media stream receiving end scores each media stream according to the identifier of each media stream.

The media stream receiving end scores each media stream according to the received identifier of each media stream, the identifier is described based on the media stream content, and therefore the score may reflect preference, a degree of concern, a policy, and the like of the media stream receiving end for each media stream.

Step S303: The media stream receiving end sends a score of each media stream to the media stream sending end, such that when it is detected that congestion occurs or congestion is resolved, the media stream sending end performs transmission bandwidth adjustment on at least one media stream according to a score of the at least one media stream.

The media stream receiving end sends the score of each media stream to the media stream sending end, such that when it is detected that the congestion occurs or the congestion is resolved, the media stream sending end may perform, according to the score of the at least one media stream, the transmission bandwidth adjustment on the media stream. Therefore, media stream transmission bandwidth adjustment may be performed, based on the media stream content, on the multiple media streams transmitted at the same transmission port.

There are multiple choices for a time of score sending. The media stream receiving end may immediately give the score after receiving the identifier sent by the media stream sending end and send the score to the media stream sending end, or may send the score only when it is detected that congestion occurs or congestion is resolved.

A manner of sending the score that is given to each media stream and sent by the media stream receiving end includes inserting the score by adding a field to a packet header of an RTP message or an RTCP message; or sending the score using an SDP message, a CLUE message, or a multimedia communication control protocol H.245 message.

According to the method for adjusting media stream transmission bandwidth provided by this embodiment of the present disclosure, a media stream receiving end gives scores to media streams according to identifiers that are of the multiple media streams and sent by a media stream sending end, and sends the scores to the media stream sending end, such that when it is detected that congestion occurs or congestion is resolved, the media stream sending end performs transmission bandwidth adjustment on a corresponding media stream according to these scores, and therefore media stream transmission bandwidth adjustment may be performed, based on media stream content, on the multiple media streams transmitted at a same transmission port, where the multiple media streams are transmitted at the same transmission port, and these identifiers are described based on the media stream content.

Figure 6:
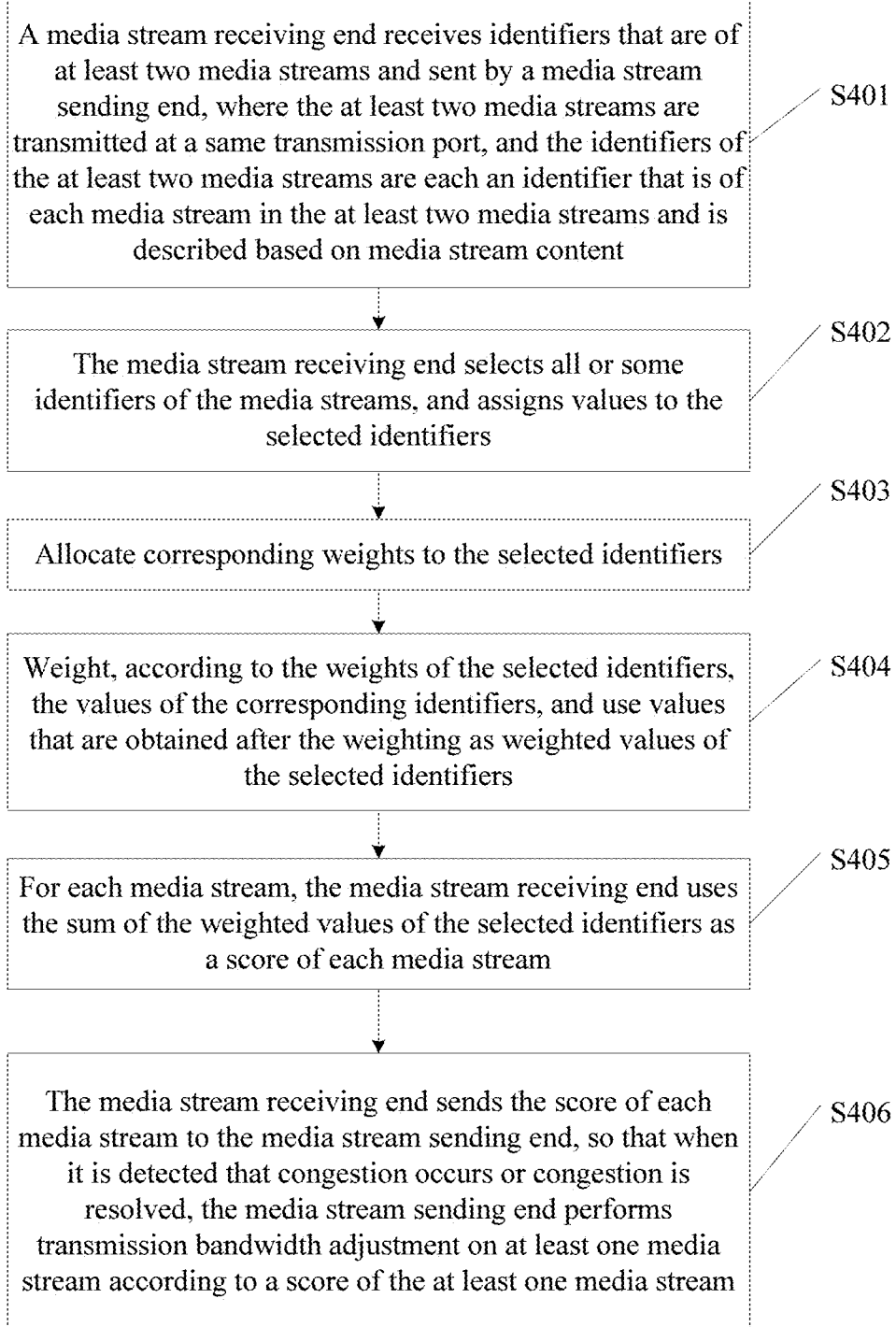
FIG. 6 is a further detailed method flowchart of the yet another embodiment of the method for adjusting media stream transmission bandwidth shown in FIG. 5 according to the present disclosure.

FIG. 6 is a further detailed method flowchart of the yet another embodiment of the method for adjusting media stream transmission bandwidth shown in FIG. 5 according to the present disclosure. As shown in FIG. 6, the method includes the following steps.

Step S401: A media stream receiving end receives identifiers that are of at least two media streams and sent by a media stream sending end, where the at least two media streams are transmitted at a same transmission port, and the identifiers of the at least two media streams are each an identifier that is of each media stream in the at least two media streams and is described based on media stream content.

This step is the same as or similar to step S301 in the foregoing embodiment, and details are not described herein again.

Step S402: The media stream receiving end selects all or some identifiers of each media stream, and assigns values to the selected identifiers.

Step S403: Allocate corresponding weights to the selected identifiers.

Step S404: Weight, according to the weights of the selected identifiers, the values of the corresponding identifiers, and use values that are obtained after the weighting as weighted values of the selected identifiers.

Step S405: For each media stream, the media stream receiving end uses the sum of the weighted values of the selected identifiers as a score of each media stream.

In step S402 to step S405, the media stream receiving end scores each media stream according to the identifier of each media stream, where the scoring manner is scoring in a weighting manner.

There are multiple optional scoring manners, which may be the following several manners or a combination thereof.

1. Select some identifiers and assign values, and discard the rest.

For example, only a scene priority and scene content are selected, and one or more other parameters are discarded and not considered.

2. Select one identifier (such as the scene priority or the scene content), and use the identifier directly as a score.

3. Allocate different weights to different identifiers, and calculate a score after weighting is performed separately.

For example, a weight 1 is allocated to the scene priority, and a weight greater than 1 (such as 3) is allocated to one or more other identifiers. In this way, influence of other factors on the score increases, and influence of the scene priority on the score reduces. Users may more subjectively select content they prefer.

For example, in a video conference, quality of an audio stream needs to be better ensured than that of a video stream, and therefore the media stream receiving end may assign a weight greater than weights of all videos to the audio stream to ensure bandwidth of the audio stream.

An active video is given more attention compared with a general video, for example, in a case in which video switching is performed according to a speaker, users care more about this scene. Therefore, in this case, the media stream receiving end may select a dynamic content collection identifier directly as a score value, or set a relatively great weight for the identifier, which serves as a main reference.

In a telepresence conference, an important person is generally in a middle screen. Taking this into consideration, the media stream receiving end may set a greater weight for a scene content identifier.

In addition, these identifiers are not limited to those listed above. Any information that the media stream sending end intends to inform the media stream receiving end may further be included.

4. The media stream receiving end may increase a score of a specific media stream as needed. (When a video stream has information that requires particular attention, special processing may be performed on the video stream)

In conclusion, the media stream sending end sends its media content to the media stream receiving end using an estimated identifier, and the media stream receiving end performs modification based on its policy according to the content, so as to obtain a final score value.

Step S406: The media stream receiving end sends the score of each media stream to the media stream sending end, such that when it is detected that congestion occurs or congestion is resolved, the media stream sending end performs transmission bandwidth adjustment on at least one media stream according to a score of the at least one media stream.

This step is the same as or similar to step S303 in the foregoing embodiment, and details are not described herein again.

According to the method for adjusting media stream transmission bandwidth provided by this embodiment of the present disclosure, a media stream receiving end gives scores to media streams according to identifiers that are of the multiple media streams and sent by a media stream sending end, and sends the scores to the media stream sending end, such that when it is detected that congestion occurs or congestion is resolved, the media stream sending end performs transmission bandwidth adjustment on a corresponding media stream according to these scores, and therefore media stream transmission bandwidth adjustment may be performed, based on media stream content, on the multiple media streams transmitted at a same transmission port, where the multiple media streams are transmitted at the same transmission port, and these identifiers are described based on the media stream content.

Figure 7:
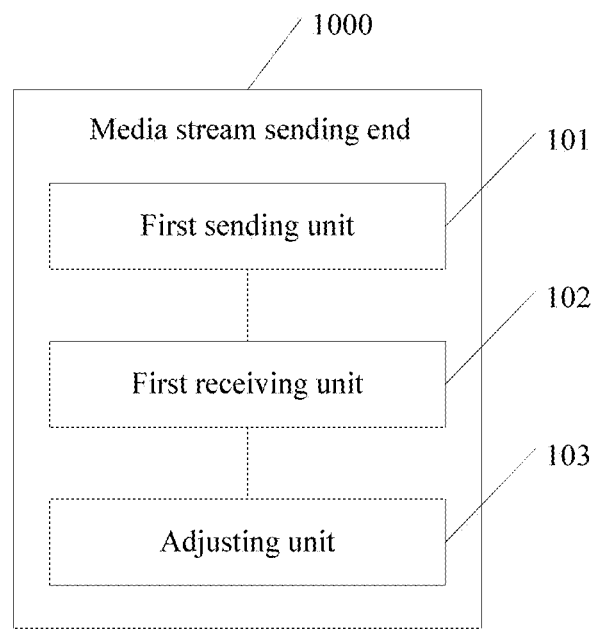
FIG. 7 is a schematic structural diagram of an embodiment of a media stream sending end according to the present disclosure.

FIG. 7 is a schematic structural diagram of an embodiment of a media stream sending end according to the present disclosure. As shown in FIG. 7, a media stream sending end 1000 includes a first sending unit 101, a first receiving unit 102, and an adjusting unit 103.

The first sending unit 101 is configured to send identifiers of at least two media streams to a media stream receiving end, where the at least two media streams are transmitted at a same transmission port, and the identifiers of the at least two media streams are each an identifier that is of each media stream in the at least two media streams and is described based on media stream content.

In this embodiment of the present disclosure, the media stream sending end sends the multiple media streams to the media stream receiving end using the same transmission port, such as a UDP port, where the media stream sending end and the media stream receiving end may be any media communications apparatus such as a conference terminal, an MCU, and a browser.

Content of each media stream is described using an identifier, and each media stream is described using one or more identifiers that are based on the media stream content. The media stream content based identifier includes one or more of the following features of each media stream: media capture content, image composed, capture content rule selection, dynamic content collection, a scene view, a role, a scene priority, presentation, and a language. Meanings of these identifiers are the same as those in the foregoing embodiments, and details are not described herein again.

The first sending unit 101 sends the identifier to the media stream receiving end, where a sending manner includes inserting the identifier by adding a field to a packet header of an RTP message or an RTCP message; or sending the identifier using an SDP message, a CLUE message, or a multimedia communication control protocol H.245 message.

The first receiving unit 102 is configured to acquire a score given by the media stream receiving end to each media stream, where the score of each media stream is given by the media stream receiving end according to the identifier of each media stream.

The first receiving unit 102 acquires the score given by the media stream receiving end to each media stream, where the score of each media stream is given by the media stream receiving end according to the received identifier of each media stream, the identifier is described based on the media stream content, and therefore the score may reflect preference, a degree of concern, a policy, and the like of the media stream receiving end for each media stream.

There are multiple choices for a time of sending the score. The media stream receiving end may immediately give the score after receiving the identifier sent by the media stream sending end, and send the score to the media stream sending end; or may send the score only when it is detected that congestion occurs or congestion is resolved.

The media stream sending end acquires the score that is given to each media stream and sent by the media stream receiving end, where a manner of sending the score includes inserting the score by adding a field to a packet header of an RTP message or an RTCP message, or sending the score using an SDP message, a CLUE message, or a multimedia communication control protocol H.245 message.

The adjusting unit 103 is configured to, when it is detected that congestion occurs or congestion is resolved, perform transmission bandwidth adjustment on at least one media stream according to a score of the at least one media stream.

When it is detected that the congestion occurs or the congestion is resolved, transmission bandwidth of one or more media streams is adjusted according to scores of the corresponding one or more multiple media streams, for example, the transmission bandwidth is reduced or increased. Each media stream may have a different score, and therefore transmission bandwidth adjustment of the corresponding media streams may be different.

According to the media stream sending end provided by this embodiment of the present disclosure, the media stream sending end acquires scores that are given, according to identifiers of multiple media streams, by a media stream receiving end to the media streams, where the multiple media streams are transmitted at a same transmission port, and these identifiers are described based on media stream content; when it is detected that congestion occurs or congestion is resolved, the media stream sending end performs transmission bandwidth adjustment on a corresponding media stream according to these scores, and therefore media stream transmission bandwidth adjustment may be performed, based on the media stream content, on the multiple media streams transmitted at the same transmission port.

FIG. 8A to FIG. 8E are further detailed schematic structural diagrams of the embodiment of the media stream sending end shown in FIG. 7 according to the present disclosure.

Figure 8A:
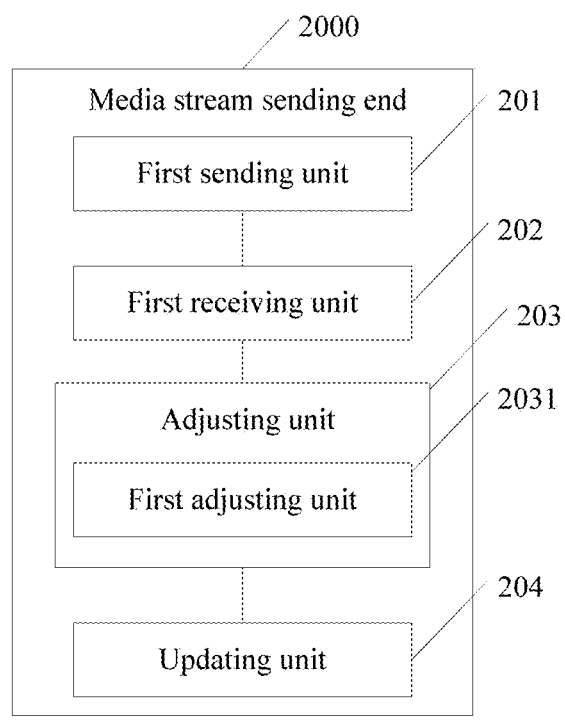
FIG. 8A to FIG. 8E are further detailed schematic structural diagrams of the embodiment of the media stream sending end shown in FIG. 7 according to the present disclosure.

As shown in FIG. 8A, a media stream sending end 2000 includes a first sending unit 201, a first receiving unit 202, an adjusting unit 203, and an updating unit 204.

The first sending unit 201 is configured to send identifiers of at least two media streams to a media stream receiving end, where the at least two media streams are transmitted at a same transmission port, and the identifiers of the at least two media streams are each an identifier that is of each media stream in the at least two media streams and is described based on media stream content.

The first receiving unit 202 is configured to acquire a score given by the media stream receiving end to each media stream, where the score of each media stream is given by the media stream receiving end according to the identifier of each media stream.

Functions of the first sending unit 201 and the first receiving unit 202 are the same as or similar to functions of the first sending unit 101 and the first receiving unit 102 in the foregoing embodiment, and details are not described herein again.

The adjusting unit 203 is configured to, when it is detected that congestion occurs or congestion is resolved, perform transmission bandwidth adjustment on at least one media stream according to a score of the at least one media stream.

As an implementation manner, the adjusting unit 203 includes a first adjusting unit 2031.

The first adjusting unit 2031 is configured to, when it is detected that the congestion occurs or the congestion is resolved, adjust transmission bandwidth of the at least one media stream according to a ratio of a score of the at least one media stream to a total score, where the total score is the sum of scores of the at least two media streams.

For transmission bandwidth adjustment, the sum of the scores of the media streams is first calculated and used as the total score, and transmission bandwidth of a corresponding media stream is adjusted according to a ratio of the score of each media stream to the total score.

Figure 8B:
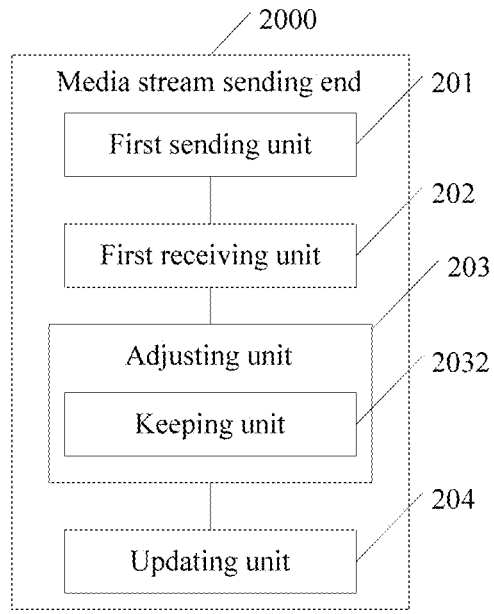

As another implementation manner, as shown in FIG. 8B, the adjusting unit 203 may further include a keeping unit 2032, where the keeping unit is configured to, when it is detected that the congestion occurs, for a media stream with a score greater than a set threshold, keep transmission bandwidth of the media stream, so as to ensure that a media stream preferred by the media stream receiving end may be transmitted smoothly. For one or more other media streams, media stream transmission bandwidth is reduced.

For example, media stream 1 whose score is 8 occupies a bandwidth of 2 M; media stream 2 whose score is 7 occupies a bandwidth of 2 M; media stream 3 whose score is 4 occupies a bandwidth of 1 M; media stream 4 whose score is 3 occupies a bandwidth of 1 M. If bandwidth of the port needs to be reduced by 2 M, the bandwidth of media stream 1 is not reduced, but the bandwidth of media stream 2, media stream 3, and media stream 4 is separately reduced by ⅔ M; or the bandwidth of media stream 1 and media stream 2 is not reduced, but the bandwidth of media stream 3 and media stream 4 is separately reduced by 1 M.

Figure 8C:
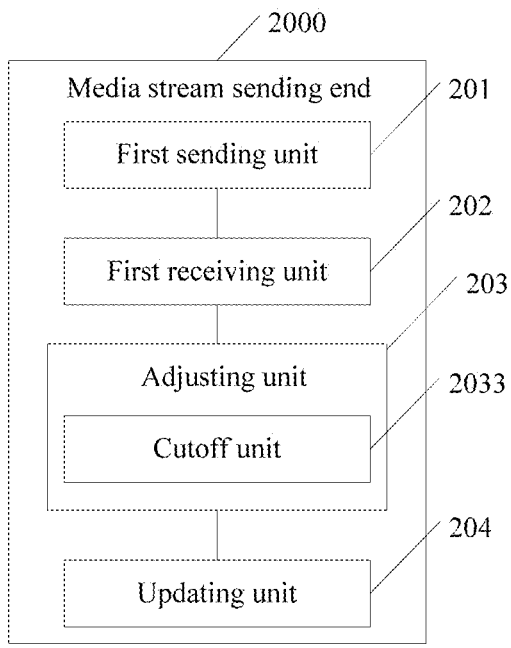

As still another implementation manner, as shown in FIG. 8C, the adjusting unit 203 may further include a cutoff unit 2033, where the cutoff unit is configured to, when it is detected that the congestion occurs, for a media stream with a score less than a set threshold, cut off transmission of the media stream. In this way, when the congestion occurs, transmission of some media streams with lower degrees of concern is cut off according to a media content based choice made by the media stream receiving end, so as to ensure transmission of one or more other media streams.

For example, media stream 1 whose score is 8 occupies a bandwidth of 2 M; media stream 2 whose score is 7 occupies a bandwidth of 2 M; media stream 3 whose score is 4 occupies a bandwidth of 1 M; media stream 4 whose score is 3 occupies a bandwidth of 1 M. If the bandwidth of the port needs to be reduced by 2 M, transmission of media stream 3 and media stream 4 is cut off to ensure that the bandwidth of media stream 1 and media stream 2 remains unchanged; if the bandwidth of the port needs to be reduced by 1 M, transmission of media stream 4 is cut off A transmission bandwidth adjustment operation performed when the congestion is resolved is reverse to that performed when the congestion occurs.

Figure 8D:
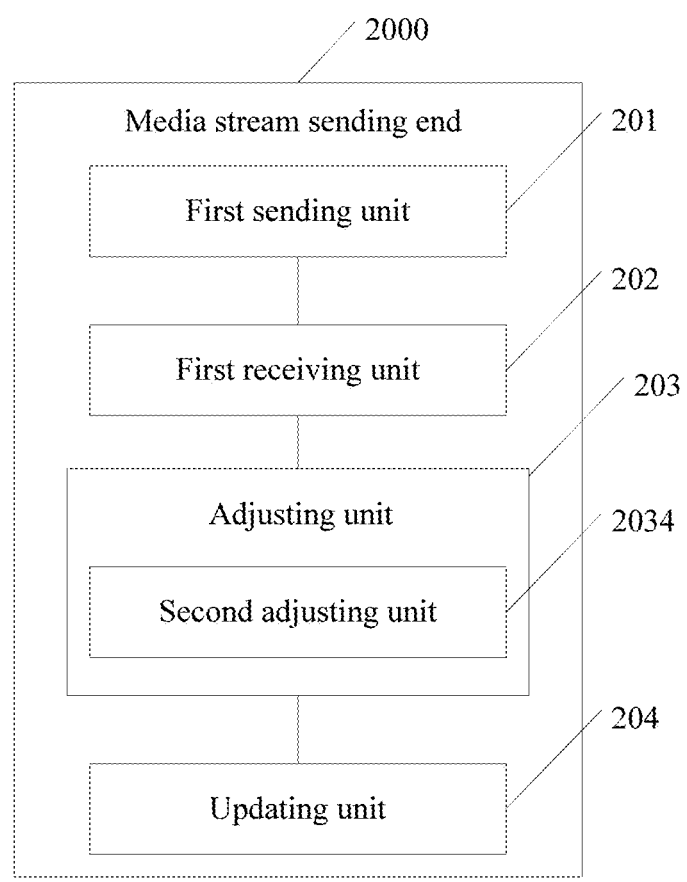

As yet another implementation manner, as shown in FIG. 8D, the adjusting unit 203 may further include a second adjusting unit 2034, where the second adjusting unit is configured to, when it is detected that the congestion is resolved, for media streams with scores greater than a third set threshold, increase transmission bandwidth of the media streams in equal proportion, and keep transmission bandwidth of one or more other media streams. In this way, it is ensured that a media stream with a greater score is given preference to obtain a transmission bandwidth resource.

Figure 8E:
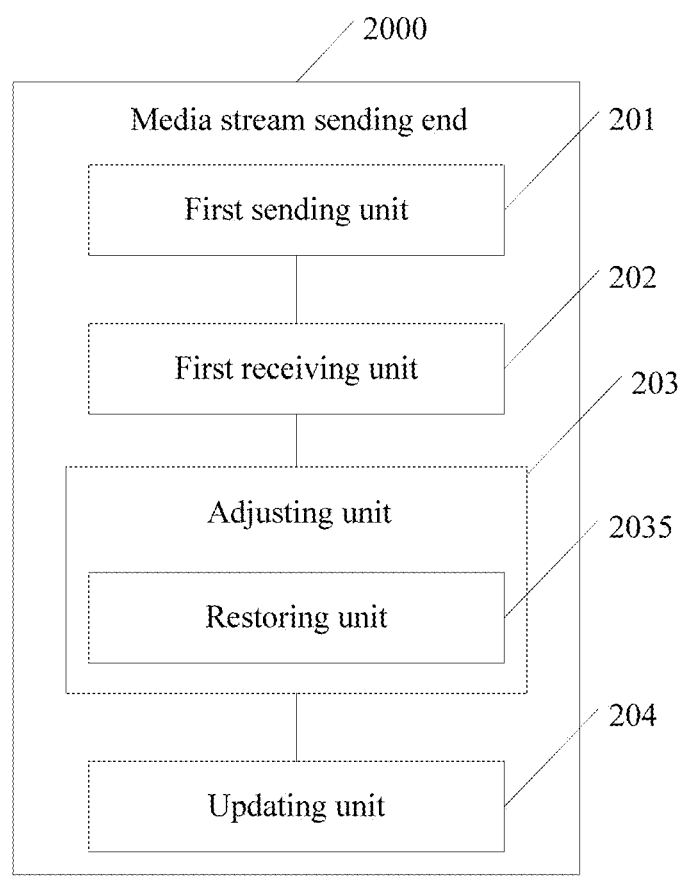

As still yet another implementation manner, as shown in FIG. 8E, the adjusting unit 203 may further include a restoring unit 2035, where the restoring unit is configured to, when it is detected that the congestion is resolved, restore transmission bandwidth of the media stream to an initial transmission bandwidth value of the media stream that is before the congestion occurs. This transmission bandwidth adjustment manner is simple and easy to implement.

It should be noted that the adjusting unit 203 may be any one of the first adjusting unit 2031, the keeping unit 2032, the cutoff unit 2033, the second adjusting unit 2034, and the restoring unit 2035 that are shown in the foregoing FIG. 8A to 8E, or may be a combination of them.

There may be the following three manners of detecting congestion or that congestion is resolved.

Manner 1: A network element device in a network detects congestion or that congestion is resolved, and informs the media stream receiving end.

Manner 2: The media stream sending end detects congestion, and informs the media stream receiving end.

Manner 3: The media stream receiving end detects congestion.

For manner 1 and manner 2, the media stream receiving end only needs to be able to parse a message sent by a network or the media stream sending end, and send a score according to the message.

For manner 3, the media stream receiving end needs to have a congestion detection capability, that is, the media stream receiving end can actively detect that congestion occurs on a network and a detection module is needed.

The updating unit 204 is configured to acquire an update that is of the scores of the at least two media streams and is provided by the media stream receiving end, and when it is detected that the at least two media streams encounter congestion or congestion is resolved, perform transmission bandwidth adjustment on the at least one media stream according to updated scores.

Possibly, because of some factors, for example, the media stream receiving end has a change in interest, the media stream receiving end may redefine a scoring rule for these media streams, and perform scoring again, which is a dynamic updating process of scores. The dynamic updating process needs to depend only on an identifier, that is, only an initial identifier is needed. Therefore, the media stream receiving end may control a time of score sending.

Refer to FIG. 4, which is a diagram of an application scenario of still another embodiment of a method for adjusting media stream transmission bandwidth according to the present disclosure. In FIGS. 4, C and D represent a port of a media stream sending end and a port of a media stream receiving end respectively, where port C is a UDP port and sends multiple media streams to port D. As shown in FIG. 4, port D separately sends two updated scores, which are separately score b and score c, and the last score is score c.

A manner of determining which score is a former score and which score is a latter score may be the following.

1. Perform determining according to a sequence in which scores are received, where after a new score is received, an old score may be directly discarded.

2. Perform determining according to sequence numbers of scores, where a score with a latter sequence number is a latest score. A sequence number of a score may be a sequence number of a message that carries the score, that is, a sequence number of an SDP, a CLUE, or an H.245 message, or a new sequence number may be allocated to the score (in this case, when the score is updated, the sequence number of the score also needs to be updated).

According to the media stream sending end provided by this embodiment of the present disclosure, the media stream sending end acquires scores that are given, according to identifiers of multiple media streams, by a media stream receiving end to the media streams, and acquires updates of the scores, where the multiple media streams are transmitted at a same transmission port, and these identifiers are described based on media stream content; when it is detected that congestion occurs or congestion is resolved, the media stream sending end performs transmission bandwidth adjustment on a corresponding media stream according to these scores, and therefore media stream transmission bandwidth adjustment may be performed, based on the media stream content, on the multiple media streams transmitted at the same transmission port.

Figure 9:
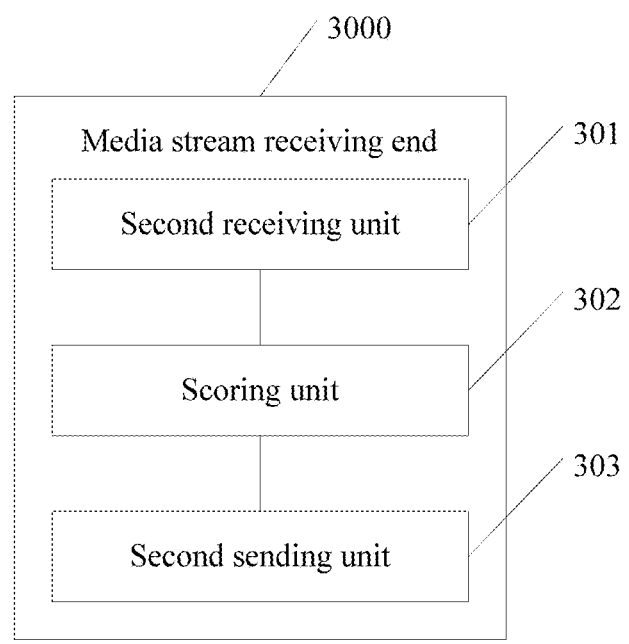
FIG. 9 is a schematic structural diagram of an embodiment of a media stream receiving end according to the present disclosure.

FIG. 9 is a schematic structural diagram of an embodiment of a media stream receiving end according to the present disclosure. As shown in FIG. 9, a media stream receiving end 3000 includes a second receiving unit 301, a scoring unit 302, and a second sending unit 303.

The second receiving unit 301 is configured to receive identifiers that are of at least two media streams and sent by a media stream sending end, where the at least two media streams are transmitted at a same transmission port, and the identifiers of the at least two media streams are each an identifier that is of each media stream in the at least two media streams and is described based on media stream content.

In this embodiment of the present disclosure, the second receiving unit 301 receives the multiple media streams sent by the media stream sending end, where the media stream sending end and the media stream receiving end may be any media communications apparatus such as a conference terminal, an MCU, and a browser.

The media stream sending end describes content of each media stream using an identifier, and each media stream is described using one or more identifiers that are based on the media stream content. The media stream content based identifier includes one or more of the following features of each media stream: media capture content, image composed, capture content rule selection, dynamic content collection, a scene view, a role, a scene priority, presentation, and a language. A definition of the identifier in this embodiment is the same as the definition of the identifier in the foregoing embodiment, and details are not described herein again.

The scoring unit 302 is configured to score each media stream according to the identifier of each media stream.

The scoring unit 302 scores each media stream according to the received identifier of each media stream, the identifier is described based on the media stream content, and therefore the score may reflect preference, a degree of concern, a policy, and the like of the media stream receiving end for each media stream.

The second sending unit 303 is configured to send a score of each media stream to the media stream sending end, such that when it is detected that congestion occurs or congestion is resolved, the media stream sending end performs transmission bandwidth adjustment on at least one media stream according to a score of the at least one media stream.

The second sending unit 303 sends the score of each media stream to the media stream sending end, such that when it is detected that the congestion occurs or the congestion is resolved, the media stream sending end may perform, according to the score of the at least one media stream, the transmission bandwidth adjustment on the media stream. Therefore, media stream transmission bandwidth adjustment may be performed, based on the media stream content, on the multiple media streams transmitted at the same transmission port.

There are multiple choices for a time of score sending. The media stream receiving end may immediately give the score after receiving the identifier sent by the media stream sending end and send the score to the media stream sending end, or may send the score only when it is detected that congestion occurs or congestion is resolved.

A manner of sending the score that is given to each media stream and sent by the media stream receiving end includes inserting the score by adding a field to a packet header of an RTP message or an RTCP message; or sending the score using an SDP message, a CLUE message, or a multimedia communication control protocol H.245 message.

According to the media stream receiving end provided by this embodiment of the present disclosure, the media stream receiving end gives scores to media streams according to identifiers that are of the multiple media streams and sent by a media stream sending end, and sends the scores to the media stream sending end, such that when it is detected that congestion occurs or congestion is resolved, the media stream sending end performs transmission bandwidth adjustment on a corresponding media stream according to these scores, and therefore media stream transmission bandwidth adjustment may be performed, based on media stream content, on the multiple media streams transmitted at a same transmission port, where the multiple media streams are transmitted at the same transmission port, and these identifiers are described based on the media stream content.

Figure 10:
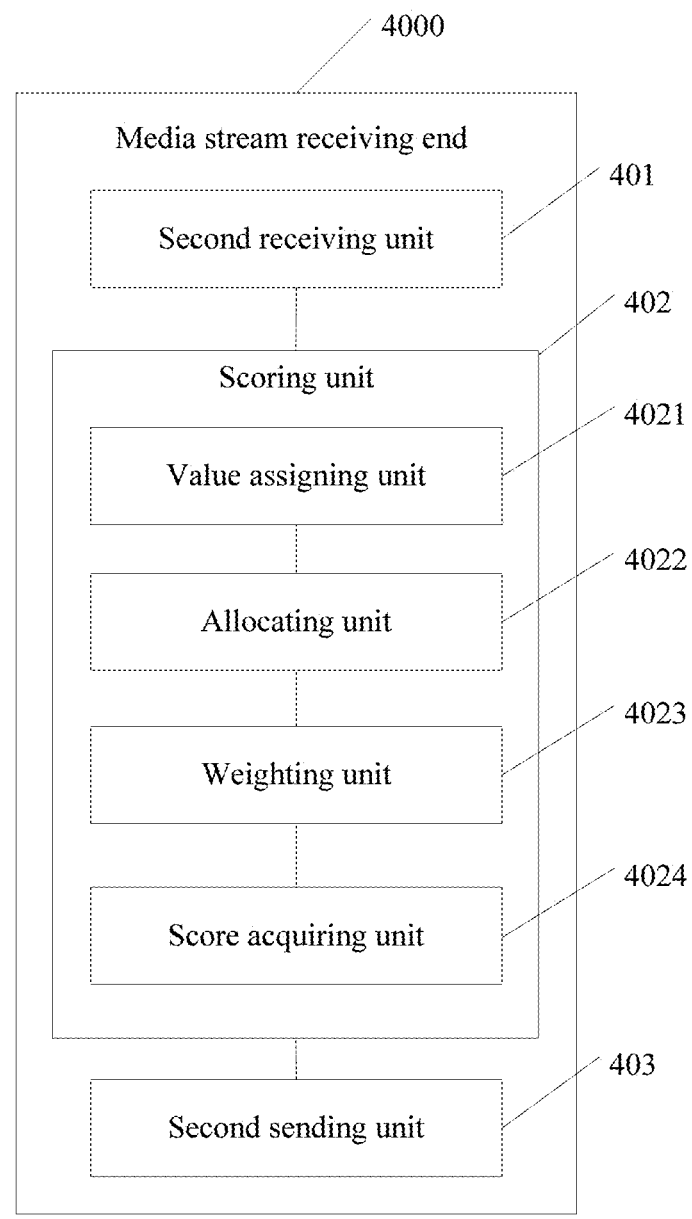
FIG. 10 is a further detailed schematic structural diagram of the embodiment of the media stream receiving end shown in FIG. 9 according to the present disclosure.

FIG. 10 is a further detailed schematic structural diagram of the embodiment of the media stream receiving end shown in FIG. 9 according to the present disclosure. As shown in FIG. 10, a media stream receiving end 4000 includes a second receiving unit 401, a scoring unit 402, and a second sending unit 403.

The second receiving unit 401 is configured to receive identifiers that are of at least two media streams and sent by a media stream sending end, where the at least two media streams are transmitted at a same transmission port, and the identifiers of the at least two media streams are each an identifier that is of each media stream in the at least two media streams and is described based on media stream content.

A function of the second receiving unit 401 is the same as or similar to a function of the second receiving unit 301 in the foregoing embodiment, and details are not described herein again.

The scoring unit 402 is configured to score each media stream according to the identifier of each media stream.

As an implementation manner, the scoring unit 402 may include a value assigning unit 4021, an allocating unit 4022, a weighting unit 4023, and a score acquiring unit 4024.

The value assigning unit 4021 is configured to select all or some identifiers of each media stream, and assign values to the selected identifiers.

The allocating unit 4022 is configured to allocate corresponding weights to the selected identifiers.

The weighting unit 4023 is configured to weight, according to the weights of the selected identifiers, the values of the corresponding identifiers, and use values that are obtained after the weighting as weighted values of the selected identifiers.

The score acquiring unit 4024 is configured to use, for each media stream, the sum of the weighted values of the selected identifiers as a score of each media stream.

The scoring unit 401 in the foregoing implementation manner scores each media stream according to the identifier of each media stream, where the scoring manner is scoring in a weighting manner.

As another implementation manner, the value assigning unit may be further configured to select all or some identifiers of each media stream, and assign values to the selected identifiers, or use initial values, assigned by the media stream sending end to the selected identifiers, as values of the selected identifiers. Correspondingly, the score acquiring unit may be further configured to use, for each media stream, the sum of the values of the selected identifiers as the score of each media stream.

There are multiple optional scoring manners, which may be the following several manners or a combination thereof.

1. Select some identifiers and assign values, and discard the rest.

For example, only a scene priority and scene content are selected, and one or more other parameters are discarded and not considered.

2. Select one identifier (such as the scene priority or the scene content), and use the identifier directly as a score.

3. Allocate different weights to different identifiers, and calculate a score after weighting is performed separately.

For example, a weight 1 is allocated to the scene priority, and a weight greater than 1 (such as 3) is allocated to one or more other identifiers. In this way, influence of other factors on the weight increases, and influence of the media stream sending end on the score reduces. Users may more subjectively select content they prefer.

For example, in a video conference, quality of an audio stream needs to be better ensured than that of a video stream, and therefore the media stream receiving end may assign a weight greater than weights of all videos to the audio stream to ensure bandwidth of the audio stream.

An active video is given more attention compared with a general video, for example, in a case in which video switching is performed according to a speaker, users care more about this scene. Therefore, in this case, the media stream receiving end may select a dynamic content collection identifier directly as a score value, or set a relatively great weight for the identifier, which serves as a main reference.

In a telepresence conference, an important person is generally in a middle screen. Taking this into consideration, the media stream receiving end may set a greater weight for a scene content identifier.

In addition, these identifiers are not limited to those listed above. Any information that the media stream sending end intends to inform the media stream receiving end may further be included.

4. The media stream receiving end may increase a score of a specific media stream as needed. (When a video stream has information that requires particular attention, special processing may be performed on the video stream)

In conclusion, the media stream sending end sends its media content to the media stream receiving end using an estimated identifier, and the media stream receiving end performs modification based on its policy according to the content, so as to obtain a final score value.

The second sending unit 403 is configured to send the score of each media stream to the media stream sending end, such that when it is detected that congestion occurs or congestion is resolved, the media stream sending end performs transmission bandwidth adjustment on at least one media stream according to a score of the at least one media stream.

A function of the second sending unit 403 is the same as or similar to a function of the second sending unit 303 in the foregoing embodiment, and details are not described herein again.

According to the media stream receiving end provided by this embodiment of the present disclosure, the media stream receiving end gives scores to media streams according to identifiers that are of the multiple media streams and sent by a media stream sending end, and sends the scores to the media stream sending end, such that when it is detected that congestion occurs or congestion is resolved, the media stream sending end performs transmission bandwidth adjustment on a corresponding media stream according to these scores, and therefore media stream transmission bandwidth adjustment may be performed, based on media stream content, on the multiple media streams transmitted at a same transmission port, where the multiple media streams are transmitted at the same transmission port, and these identifiers are described based on the media stream content.

Figure 11:
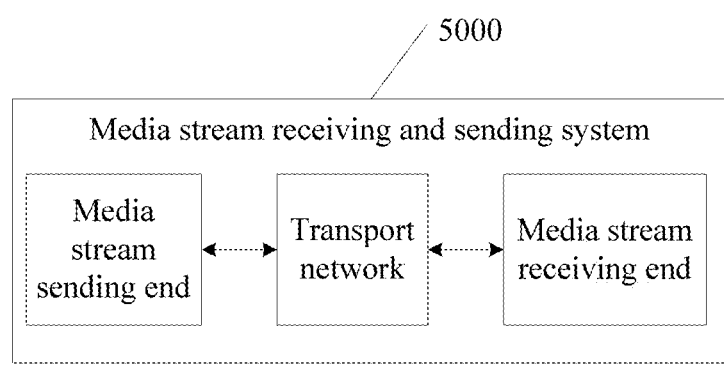
FIG. 11 is a schematic structural diagram of an embodiment of a media stream receiving and sending system according to the present disclosure.

An embodiment of the present disclosure further provides a media stream receiving and sending system. FIG. 11 is a schematic structural diagram of an embodiment of a media stream receiving and sending system according to the present disclosure. As shown in FIG. 11, a media stream receiving and sending system 5000 includes the media stream sending end and the media stream receiving end in the foregoing embodiments, and a transport network, where the media stream sending end and the media stream receiving end exchange information using the transport network.

According to the media stream receiving and sending system provided by this embodiment of the present disclosure, a media stream sending end acquires scores that are given, according to identifiers of multiple media streams, by a media stream receiving end to the media streams, where the multiple media streams are transmitted at a same transmission port, and these identifiers are described based media stream content; when it is detected that congestion occurs or congestion is resolved, the media stream sending end performs transmission bandwidth adjustment on a corresponding media stream according to these scores, and therefore media stream transmission bandwidth adjustment may be performed, based on the media stream content, on the multiple media streams transmitted at the same transmission port.

What is disclosed above is merely exemplary embodiments of the present disclosure, and is not intended to limit the protection scope of the present disclosure. Therefore, equivalent variations made in accordance with the claims of the present disclosure shall fall within the scope of the present disclosure.

What is claimed is:

1. A method for adjusting media stream transmission bandwidth, the method comprising:
    sending, by a media stream transmitter, a plurality of identifiers of a plurality of media streams to a media stream receiver, wherein the plurality of media streams are transmitted from a same transmission port, wherein each of the plurality of identifiers correspond to one of the plurality of media streams, and wherein the plurality of identifiers correspond to media stream content of the plurality of media streams;
    receiving, by the media stream transmitter, a plurality of scores from the media stream receiver corresponding to the plurality of media streams, wherein the plurality of scores is based on the plurality of identifiers; and
    performing transmission bandwidth adjustment on at least one of the plurality of media streams based on a score of the at least one of the plurality of media streams when congestion occurs or when congestion is resolved,
    wherein performing transmission bandwidth adjustment comprises adjusting transmission bandwidth of the at least one media stream based on a ratio of the score to a total score, wherein the total score is a sum of scores of the plurality of media streams.

2. The method of claim 1, wherein the plurality of identifiers comprise one or more of the following features: media capture content, image composed, capture content switching, a rule for determining capture content, dynamic content collection, a scene view, a role, a scene priority, presentation, and a language.

3. The method of claim 1, wherein a specific identifier of the plurality of identifiers corresponding to a specific media stream of the plurality of media streams and a specific score of the plurality of scores corresponding to the specific media stream are transmitted in a field of a packet header of at least one of a Real-Time Transport Protocol (RTP) message or a Real-Time Transport Control Protocol (RTCP) message.

4. The method of claim 1, wherein the plurality of identifiers and the plurality of scores are transmitted by at least one of: Session Description Protocol (SDP) messages, Controlling Multiple Streams for Telepresence (CLUE) messages, and multimedia communication control protocol H.245 messages.

5. The method of claim 1, wherein performing transmission bandwidth adjustment comprises maintaining transmission bandwidth of a particular media stream with a score greater than a threshold.

6. The method of claim 1, wherein performing transmission bandwidth adjustment comprises cutting off transmission of a particular media stream with a score less than a threshold.

7. The method of claim 1, wherein performing transmission bandwidth adjustment comprises increasing transmission bandwidth of a group of media streams in equal proportion with scores greater than a threshold, and maintaining transmission bandwidth of one or more other media streams in the plurality of media streams not in the group of media streams.

8. The method of claim 1, wherein performing transmission bandwidth adjustment comprises restoring transmission bandwidth of the at least one media stream to an initial transmission bandwidth value set before the congestion occurred.

9. The method of claim 1, further comprising
    receiving, by the media stream transmitter, a plurality of updated scores of the plurality of media streams from the media stream receiver; and
    performing transmission bandwidth adjustment based on an updated score of the at least one media streams.

10. A method for adjusting media stream transmission bandwidth, comprising:
    receiving, by a media stream receiver, a plurality of identifiers of a plurality of media streams from a media stream transmitter, wherein the plurality of media streams are transmitted from a same transmission port, wherein each of the plurality of identifiers corresponds to one of the plurality of media streams, wherein the plurality of identifiers correspond to media stream content of the plurality of media streams, and wherein each of the plurality of identifiers comprises a plurality of features;
    scoring, by the media stream receiver, each of the plurality of media streams based on the identifier of each media stream; and
    sending, by the media stream receiver, a score of each media stream to the media stream transmitter, and
    wherein scoring comprises:
        selecting, by the media stream receiver, at least one feature of each media stream;
        assigning values to the selected features, wherein the values are assigned based on initial values assigned by the media stream transmitter, or determined by the media stream receiver; and
        using, by the media stream receiver, for each media stream, a sum of the values of the selected features as the score of each media stream.

11. The method according to claim 10, wherein, after the assigning of values to the selected features, the method further comprises:
    allocating corresponding weights to the selected features; and
    weighting, according to the weights of the selected features, the values of the corresponding features; and
    using values that are obtained after the weighting as weighted values of the selected features, wherein, using the sum of the values of the selected features as the score of each media stream comprises, for each media stream, using, by the media stream receiver, the sum of the weighted values of the selected features as the score of each media stream.

12. A media stream transmitter, comprising:
    a memory; and
    a processor coupled to the memory, the processor configured to:
        send a plurality of identifiers of a plurality of media streams to a media stream receiver, wherein the plurality of media streams are transmitted from a same transmission port, wherein each of the plurality of identifiers correspond to one of the plurality of media streams, and wherein the plurality of identifiers correspond to media stream content of the plurality of media streams;
        receive a plurality of scores from the media stream receiver corresponding to each of the plurality of media streams, wherein the plurality of scores is based on the plurality of identifiers; and
        perform transmission bandwidth adjustment on at least one of the plurality of media streams based on a score of the at least one of the plurality of media streams when congestion occurs or when congestion is resolved;

adjust transmission bandwidth of the at least one media stream based on a ratio of the score of the at least one media stream to a total score, wherein the total score is a sum of scores of the plurality of media streams;

maintain transmission bandwidth of a media stream with a score greater than a first set threshold;

cut off transmission of a media stream with a score less than a second set threshold;

increase transmission bandwidth in equal proportion for media streams with scores greater than a third set threshold, and maintain transmission bandwidth of one or more other media streams of the plurality of media streams; and restore transmission bandwidth of the at least one media stream to an initial transmission bandwidth value when the congestion is resolved.

13. The media stream transmitter of claim 12, wherein the plurality of identifiers comprises one or more of the following features: media capture content, image composed, capture content switching, a rule for determining capture content, dynamic content collection, a scene view, a role, a scene priority, presentation, and a language.

14. The media stream transmitter of claim 12, wherein ones of the plurality of identifiers and ones of the plurality of scores are transmitted by at least one of:

a field of a packet header of at least one of a Real-Time Transport Protocol (RTP) message or a Real-Time Transport Control Protocol (RTCP) message to carry at least one of the identifier of each media stream and the score of each media stream;

Session Description Protocol (SDP) messages;

Controlling Multiple Streams for Telepresence (CLUE) messages; or multimedia communication control protocol H.245 messages.

15. The media stream transmitter of claim 12, wherein the processor is further configured to:

receive a plurality of updated scores of the plurality of media streams from the media stream receiver; and perform transmission bandwidth adjustment on the at least one media stream based on the updated score.

16. A media stream transmission system comprising:

a media stream receiver; and a media stream transmitter, wherein the media stream transmitter and the media stream receiver are configured to:

send a plurality of identifiers of a plurality of media streams to the media stream receiver, wherein the plurality of media streams are transmitted from a same transmission port, wherein each of the plurality of identifiers correspond to one of the plurality of media streams, and wherein the plurality of identifiers correspond to media stream content of the plurality of media streams;

receive a plurality of scores given by the media stream receiver to each of the plurality of media streams, wherein the score of each media stream is based on the plurality of identifiers;

perform transmission bandwidth adjustment on at least one of the plurality of media streams based on a score of the at least one of the plurality of media streams when congestion occurs or when congestion is resolved, wherein performing transmission bandwidth adjustment comprises adjusting transmission bandwidth of the at least one media stream based on a ration of the score to a total score, wherein the total score is a sum of scores of the plurality of media streams;

receive the plurality of identifiers from the media stream transmitter;

score each media stream based on the identifier of each media stream; and send the score of each media stream to the media stream transmitter.

* * * * *

UNITED STATES PATENT AND TRADEMARK OFFICE
CERTIFICATE OF CORRECTION

PATENT NO. : 10,050,882 B2
APPLICATION NO. : 14/880591
DATED : August 14, 2018
INVENTOR(S) : Jing Xiao et al.

Page 1 of 1

It is certified that error appears in the above-identified patent and that said Letters Patent is hereby corrected as shown below:

On the Title Page

Item (30), Line 1: "201310131471" should read "201310131471.1"

In the Claims

Column 30, Line 29: "ration" should read "ratio"

Signed and Sealed this
Second Day of October, 2018

Andrei Iancu
*Director of the United States Patent and Trademark Office*